(12) United States Patent
Park et al.

(10) Patent No.: US 11,989,978 B2
(45) Date of Patent: May 21, 2024

(54) METHOD OF DETECTING USER INTERACTION AND ELECTRONIC DEVICE SUPPORTING THE SAME

(71) Applicants: WOONGJIN THINKBIG CO., LTD., Paju-si (KR); ARTYGENSPACE CO., LTD., Seoul (KR)

(72) Inventors: Jeongwook Park, Paju-si (KR); Myeonghyeon Hwang, Paju-si (KR); Suhyoung Lim, Paju-si (KR); Jungwoo Choi, Seoul (KR); Youngsun Seo, Seoul (KR)

(73) Assignees: WOONGJIN THINKBIG CO., LTD., Paju-si (KR); ARTYGENSPACE CO., LTD., Seoul (KR)

(*) Notice: Subject to any disclaimer, the term of this patent is extended or adjusted under 35 U.S.C. 154(b) by 0 days.

(21) Appl. No.: 18/146,632

(22) Filed: Dec. 27, 2022

(65) Prior Publication Data
US 2023/0215218 A1   Jul. 6, 2023

(30) Foreign Application Priority Data
Dec. 30, 2021   (KR) .................. 10-2021-0193214

(51) Int. Cl.
| | | |
|---|---|---|
| G06F 3/042 | (2006.01) | |
| G06F 3/01 | (2006.01) | |
| G06T 7/62 | (2017.01) | |
| G06V 10/20 | (2022.01) | |
| G06V 20/20 | (2022.01) | |
| G06V 40/20 | (2022.01) | |

(52) U.S. Cl.
CPC .............. *G06V 40/28* (2022.01); *G06F 3/011* (2013.01); *G06F 3/042* (2013.01); *G06T 7/62* (2017.01); *G06V 10/255* (2022.01); *G06V 20/20* (2022.01); *G06V 2201/131* (2022.01)

(58) Field of Classification Search
CPC ......... G06F 3/011; G06F 3/042; G06F 3/0425
See application file for complete search history.

(56) References Cited

U.S. PATENT DOCUMENTS

| | | | |
|---|---|---|---|
| 2010/0188428 A1 | 7/2010 | Shin et al. | |
| 2012/0113228 A1* | 5/2012 | Konno | ................ H04N 13/356 348/47 |
| 2013/0250322 A1* | 9/2013 | Kawabata | ............ H04N 1/6058 358/1.9 |

(Continued)

FOREIGN PATENT DOCUMENTS

| | | |
|---|---|---|
| KR | 10-2010-0042006 A | 4/2010 |
| KR | 10-2015-0072729 A | 6/2015 |

OTHER PUBLICATIONS

Korean Office Action dated Jul. 20, 2020, issued in a Korean Application No. 10-2021-0193214.

*Primary Examiner* — Van N Chow
(74) *Attorney, Agent, or Firm* — Jefferson IP Law, LLP

(57) ABSTRACT

A method of detecting a user interaction by an electronic device according to various embodiments may include acquiring, through a camera, a first image of a real document in which at least one first area is printed, determining whether at least one first part corresponding to the at least one first area and included in the first image is changed, and performing a function of the electronic device corresponding to the at least one first part, based on determining that the at least one first part is changed.

14 Claims, 22 Drawing Sheets

(56) References Cited

U.S. PATENT DOCUMENTS

2015/0180916 A1    6/2015  Ahn et al.
2018/0027206 A1*  1/2018  Li ...................... G06F 3/04842
                                               348/333.02

* cited by examiner

METHOD OF DETECTING USER INTERACTION AND ELECTRONIC DEVICE SUPPORTING THE SAME

CROSS-REFERENCE TO RELATED APPLICATION(S)

This application is based on and claims priority under 35 U.S.C. 119 to Korean Patent Application No. 10-2021-0193214, filed on Dec. 30, 2021, in the Korean Intellectual Property Office, the disclosure of which is herein incorporated by reference in its entirety.

TECHNICAL FIELD

Various embodiments of the disclosure relate to a method of detecting a user interaction and an electronic device supporting the same.

BACKGROUND

Electronic devices such as smartphones and tablets are widely supplied. The electronic devices may provide various contents to users through displays. For example, the electronic devices may provide electronic books including text and/or images which are substantially the same as the content in real books.

The electronic device may perform a function on the basis of a user input while the electronic book is displayed through the display. For example, the electronic device may output pronunciation of English words and/or meanings of English words through an audio device on the basis of a user input for an area displaying the English words while the electronic book including the English words is displayed.

Further, when the electronic device is located within a range of an angle of view of a camera, the electronic device may acquire an image of the real book through the camera. The electronic device may display an image related to the acquired image of the real book through the display.

SUMMARY

An electronic device may perform a function on the basis of a user input for an image (for example, an image which is substantially the same as an image of a real book) related to the real book located within a range of an angle of view of a camera of the electronic device and displayed through a display.

The electronic device may have difficulty in performing the function on the basis of a user interaction (for example, a user action of contacting the real book by using a finger) for the real book.

Various embodiments of the disclosure relate to a method of detecting a user interaction for allowing the electronic device to provide the function on the basis of the user interaction for a document (for example, a real book) and an electronic device supporting the same.

The technical subjects pursued in the disclosure may not be limited to the above-mentioned technical subjects, and other technical subjects which are not mentioned may be clearly understood, through the following descriptions, by those skilled in the art to which the disclosure pertains.

A method of detecting a user interaction by an electronic device includes acquiring, through a camera, a first image of a real document in which at least one first area is printed, determining whether at least one first part corresponding to the at least one first area and included in the first image is changed, and performing a function of the electronic device corresponding to the at least one first part, based on the determination that the at least one first part is changed.

A non-transitory computer-readable medium storing a program code which can be executed by a processor according to various embodiments is provided. When the program code is executed, the program code is configured to cause the processor to acquire, through a camera, a first image of a real document in which at least one first area is printed, determine whether at least one first part corresponding to the at least one first area and included in the first image is changed, and perform a function of the electronic device corresponding to the at least one first part, based on the determination that the at least one first part is changed.

A method of detecting a user interaction and an electronic device supporting the same according to various embodiments can allow the electronic device to provide a function on the basis of a user interaction for a document (for example, a real book).

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
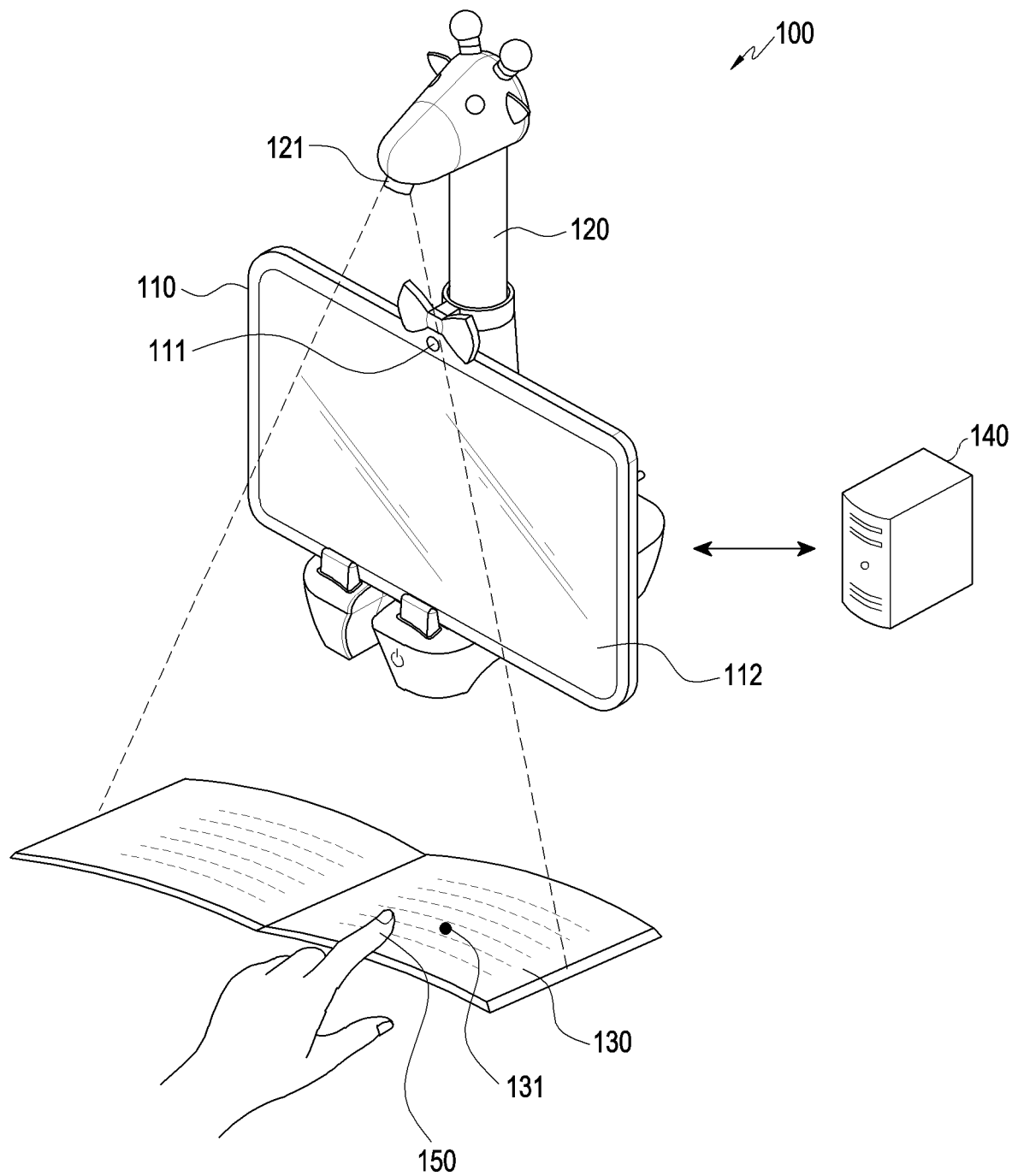
FIG. 1 illustrates a method of detecting a user interaction according to various embodiments.

According to various embodiments, the embodiments set forth herein are intended to clearly explain the idea of the disclosure to those skilled in the art to which the disclosure pertains, and thus the disclosure is not limited to the embodiments set forth below. Also, according to various embodiments, the scope of the disclosure should be construed to cover modifications and changes that do not depart from the spirit of the disclosure.

The terms used herein are currently widely used general terms selected in consideration of the functions in the disclosure as much as possible, but may be different according to intentions of those skilled in the art, customs, or emergence of new technologies. In contrast, when a specific term defined to have an arbitrary meaning is used, the meaning of the term will be separately set forth. Therefore, the terms should be interpreted based on the substantial meanings of the terms and the contents throughout the specification, rather than the nominal names of the terms.

The accompanying drawings of the disclosure are for the purpose of easy explanation of the disclosure, and according to various embodiments, the shapes illustrated in the drawings may be exaggerated in order to help understanding of the disclosure, and thus the disclosure is not limited by the drawings.

In the disclosure, a detailed description of known configurations or functions incorporated herein will be omitted when it is determined that the description may make the subject matter of the disclosure unclear.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

The operations of a machine (e.g., the electronic device 110, the camera device 120, or the server 140) as set forth in the embodiments of the disclosure may be implemented as software (e.g., a program) including one or more instructions that are stored in a storage medium readable by the machine. For example, a control circuit (e.g., a processor) of the machine (e.g., the electronic device 110) may invoke at least one of the one or more stored instructions from the storage medium, and execute it. This allows the machine to be operated to perform at least one function according to the at least one instruction invoked. The one or more instructions each may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

FIG. 1 is a view 100 illustrating a method of detecting a user interaction according to various embodiments.

In an embodiment, FIG. 1 is a view illustrating a system for performing the method of detecting the user interaction.

Referring to FIG. 1, the system for performing the method of detecting the user interaction may include an electronic device 110, a camera device 120, and a server 140.

In an embodiment, the electronic device 110 may detect a user interaction for a document 130 on the basis of an image of the document 130.

In an embodiment, the document 130 may include a real book. For example, the document 130 may include a real book including one or more pages having printed text and/or images on paper. However, it is not limiting, and the document 130 may include images displayed through electronic devices (for example, a smartphone and a tablet) other than the electronic device 110. Hereinafter, for convenience of description, it is assumed that the document 130 is a real book.

In an embodiment, the document 130 may include at least one area (hereinafter, referred to as 'at least one first area') (for example, areas 131) in which the electronic device 110 performs a function through an interaction with the user. For example, when the document 130 is contacted by an input tool (for example, a user's finger 150, an electronic pen or a marker) may include at least one first area in which the electronic device 110 performs the function. In an embodiment, at least one first area may include various figures and/or images printed in the document 130. However, at least one first area is not limited to the figures and/or images printed in the document 130.

In an embodiment, the electronic device 110 may acquire an image for the document 130 through a camera. For example, the electronic device 110 may receive an image of the document 130 acquired through a first camera 121 (hereinafter, referred to as a 'first camera') of the camera device 120 from the camera device 120. In another example, the electronic device 110 may acquire the image for the document 130 through a second camera 111 (hereinafter, referred to as a 'second camera') included in the electronic device 110. The electronic device 110 may detect a user interaction for at least one first area on the basis of the image received from the camera device 120 or the image acquired through the second camera 111. In an embodiment, the user interaction for at least one first area may include a user action of touching at least one first area (or hiding at least one first area). In an embodiment, the electronic device 110 may perform the function of the electronic device 110 on the basis of the user interaction for at least one first area. The electronic device 110 may output a result of the performance of the function of the electronic device 110. For example, the electronic device 110 may display a screen showing the result of the performance of the function of the electronic device 110 through a display module 112. The operation in which electronic device 110 detects the user interaction for at least one first area on the basis of the acquired image and the operation of outputting the result of the performance of the function of the electronic device 110 by performing the function of the electronic device 110 are described below in detail.

In an embodiment, the camera device 120 may acquire an image through the first camera 121. For example, the camera device 120 may acquire an image for the document 130 of which at least a part is located within a range of an angel of view of the first camera 121 through the first camera 121. In an embodiment, the camera device 120 may transmit the acquired image for the document 130 to the electronic device 110 through a communication module (for example, a wireless communication module or a wired communication module).

In an embodiment, the camera device 120 may hold the electronic device 110. For example, the camera device 120 may include a housing implemented to hold the electronic device 110 as illustrated in FIG. 1.

In an embodiment, the server 140 may communicate with the electronic device 110 though the communication module. In an embodiment, the server 140 may transmit data related to the document 130 to the electronic device 110 through the communication module. For example, when the document 130 includes a plurality of pages, the electronic device 110 may acquire an image for the cover (for example, the first page) among the plurality of pages through the camera (for example, the first camera 121 or the second camera 111). The electronic device 110 may identify the document 130 on the basis of at least a part of the image for the cover. For example, the electronic device 110 may identify the title and/or the type of the document 130 by identifying the image printed on the cover. The electronic device 110 may make a request for data related to the identified document 130 to the server 140 through the communication module. The server 140 may transmit the data related to the identified document 130 to the electronic device 110 through the communication module in response to the request. For example, the server 140 may transmit data on a plurality of pages (for example, a plurality of pages including content which is substantially the same as content of the plurality of pages included in the document 130 and can be displayed through the display module 112) corresponding to the plurality of pages included in the document 130 to the electronic device 110 through the communication module.

In an embodiment, the server 140 may perform a part of the operation in which the electronic device 110 detects the user interaction described below.

Figure 2:
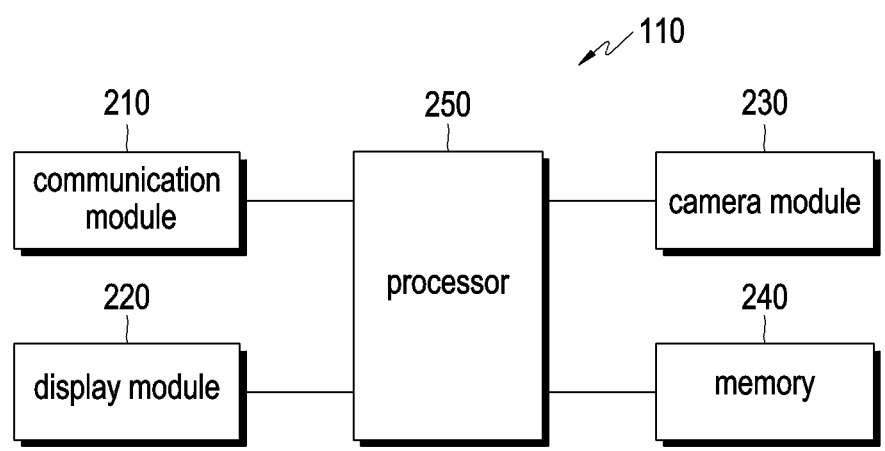
FIG. 2 is a block diagram illustrating an electronic device according to various embodiments.

FIG. 2 is a block diagram illustrating the electronic device 110 according to various embodiments.

Referring to FIG. 2, in an embodiment, the electronic device 110 may include a communication module 210, a display module 220, a camera module 230, a memory 240, and/or a processor 250.

In an embodiment, the communication module 210 may establish a direct (for example, wired) communication channel and a wireless communication channel between the electronic device 110 and an external electronic device (for example, the camera device 120 or the server) and support communication through the established communication channel.

In an embodiment, the communication module 210 may include a wireless communication module (for example, a cellular communication module, a short-range wireless communication module, or a global navigation satellite system (GNSS) communication module) or a wired communication module (for example, a local area network (LAN) communication module or a power line communication module).

In an embodiment, the display module 220 (for example, the display module 112 of FIG. 1) may visually provide information to the outside of the electronic device 110 (for example, the user). The display module 220 may include a display, a hologram device, a projector, or a control circuit for controlling the corresponding device. In an embodiment, the display module 220 may include a touch sensor configured to detect a touch or a pressure sensor configured to measure an intensity of force generated by the touch.

In an embodiment, the camera module 230 may include a camera (for example, the second camera 111 of FIG. 1) for capturing a still image and a moving image. In an embodiment, the camera module 230 may include one or more lenses, image sensors, image signal processors, or flashes.

In an embodiment, the memory 240 may store various pieces of data used by at least one element of the electronic device 110 (for example, the processor 250).

In an embodiment, the memory 240 may store information for the operation of detecting the user interaction. The information for the operation of detecting the user interaction stored in the memory 240 is described below in detail.

In an embodiment, the processor 250 may execute, for example, software (for example, programs) to control at least one other element (for example, hardware or software elements) of the electronic device 110 connected to the processor 250 and perform various data processing or calculations.

In an embodiment, the processor 250 may overall control the operation of detecting the user interaction. In an embodiment, the processor 250 may include one or more processors for performing the operation of detecting the user interaction. The operation performed for detecting the user interaction by the processor 250 is described below with reference to FIG. 3 and the following figures.

FIG. 2 illustrates that the electronic device 110 includes the communication module 210, the display module 220, the camera module 230, the memory 240, and/or the processor 250, but the electronic device 110 may further include an additional element as well as the elements illustrated in FIG. 2 or may not include some of the elements illustrated in FIG. 2. For example, the electronic device 110 may further include an input module (for example, a microphone, a mouse, a keyboard, a key (for example, a button), or a digital pen (for example, a stylus pen)) capable of receiving commands or data to be used for an element (for example, the processor 250) from the outside (for example, the user) of the electronic device 110 and a sound output module capable of outputting a sound signal to the outside of the electronic device 110. In another example, when the electronic device 110 performs the operation of detecting the user interaction on the basis of the image for the document received from the camera device 120, the processor 250 may not include the camera module 230.

Figure 3:
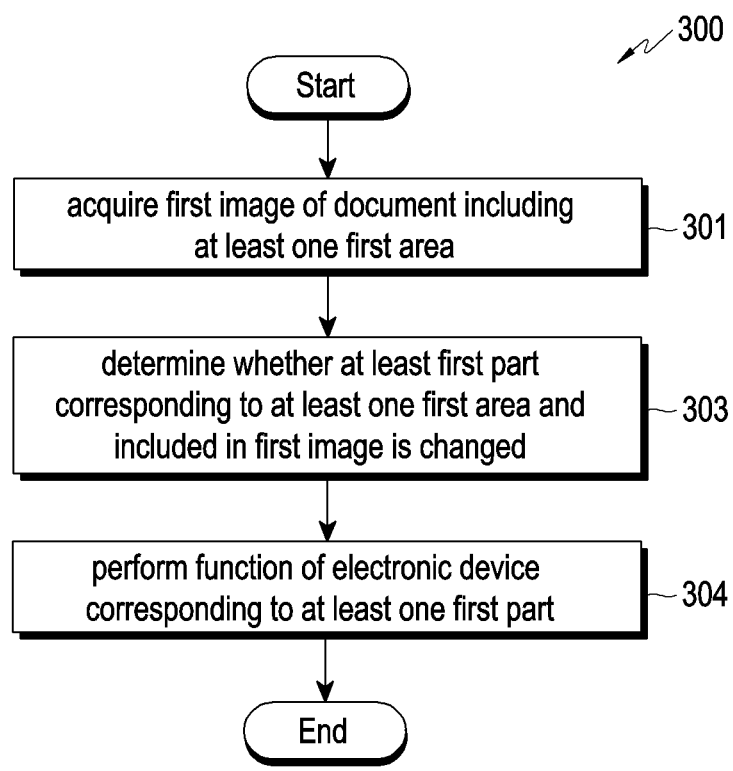
FIG. 3 is a flowchart illustrating a method of detecting a user interaction according to various embodiments.

FIG. 3 is a flowchart 300 illustrating a method of detecting a user interaction according to various embodiments.

Referring to FIG. 3, in an embodiment, the processor 250 may acquire a first image including at least one first area (hereinafter, referred to as a 'first image') through a camera in operation 301.

In an embodiment, at least one first area may be areas in which the electronic device 110 performs the function on the basis of a user interaction for at least one first area. For example, when at least one first area is contacted by an input tool (for example, a user's finger, an electronic pen, or a marker), at least one first area may be areas in which the electronic device 110 performs the function. In an embodiment, at least one first area may include various figures and/or images printed in the document.

In an embodiment, the processor 250 may receive a first image of the document acquired using the first camera 121 by the camera device 120 through the communication module 210. However, it is not limited thereto, and the processor 250 may acquire the first image of the document through the camera module 230 (for example, the second camera 111).

In an embodiment, the first image may include a plurality of frames successively acquired through the camera (for example, the first camera 121 and/or the second camera 111). However, it is not limited thereto, and the first image may be one frame acquired through the camera.

Although not illustrated in FIG. 3, in an embodiment, when the document includes a plurality of pages, the processor 250 may acquire an image for the cover through the camera (for example, the first camera 121 and/or the second camera 111). The processor 250 may identify the document by identifying an image corresponding (for example, mapped) to at least a part of the image for the cover and stored in the memory 240. The processor 250 may make a request for data related to the identified document to the server 140 through the communication module 210. The processor 250 may receive the data related to the identified document through the communication module 210 from the server 140 in response to the request. For example, the processor 250 may receive data on a plurality of pages (for example, a plurality of pages including content which is substantially the same as the content of the plurality of pages included in the document and can be displayed through the display module 220) corresponding to the plurality of pages included in the document from the server 140 through the communication module 210. In an embodiment, the processor 250 may store the data related to the identified document received from the server 140 in the memory 240. The processor 250 may display at least a part of the data related to the identified document received from the server 140 through the display module 220.

In operation 303, in an embodiment, the processor 250 may determine whether at least a first part which corresponds to at least one first area and is included in the first image (hereinafter, referred to as 'at least one first part') is changed.

In an embodiment, at least one first part may be image parts for at least one first area printed in the document within the first image (for example, parts capturing at least one first area printed in the document within the first image).

In an embodiment, the processor 250 may determine whether areas and/or shapes of at least one first part are changed.

In an embodiment, the processor 250 may successively acquire a plurality of frames through the camera (for example, the first camera 121 and/or the second camera 111) as the first image. The processor 250 may determine whether areas and/or shapes of at least one first part included in each of the plurality of frames are changed. For example, the user may touch at least one first area by using an input tool (for example, a finger) between a first time point and a second time point. In another example, the user may hide at least one first area by using an input tool (for example, a finger) between a first time point and a second time point. The processor 250 may acquire a first frame including at least one first part corresponding to at least one first area which is not touched (or hidden) by the input tool at the first time point and a second frame including at least one first part corresponding to at least one first area of which at least a part is touched (or hidden) by the input tool at the second time point through the camera (for example, the first camera 121 and/or the second camera 111). The first frame may include at least one first part corresponding to at least one first area, and the second frame may include at least one first part of which an area of at least a part is reduced and/or a share of at least a part is changed. When it is identified that the areas and/or the shares of at least one first part are changed within the first frame acquired at the first time point and the second frame acquired at the second time point, the processor 250 may determine that at least one first part is changed.

In an embodiment, the processor 250 may determine whether at least one first part is changed on the basis of the change in the areas and/or the shares of at least one first part and maintenance time of the changed areas and/or shapes of at least one first part.

In an embodiment, when the time from the time point at which the areas and/or the shapes of at least one first part are changed to the time point at which the areas and/or the shapes of at least one first part are restored to the state before the change after the changed areas and/or shares of at least one first part are maintained is shorter than a predetermined time, the processor 250 may determine that at least one first part is not changed. For example, when the areas of at least one first part increase to the areas before the reduction within a predetermined time from the time point at which the areas of at least one first part are reduced, the processor 250 may determine that at least one first part is not changed.

In an embodiment, when the time from the time point at which the areas and/or the shapes of at least one first part are changed to the time point at which the areas and/or the shapes of at least one first part are restored to the state before the change after the changed areas and/or shares of at least one first part are maintained is the same as or longer than a predetermined time, the processor 250 may determine that at least one first part is changed. For example, when the areas of at least one first part increase to the areas before the reduction after a predetermined time from the time point at which the areas of at least one first part are reduced, the processor 250 may determine that at least one first part is changed. The processor 250 determines whether at least one first part is changed on the basis of the change in the areas and/or shapes of at least one first part and the time during which the changed areas and/or shapes of at least one first part are maintained and thus, when at least one first area is touched for a time equal to or shorter than the predetermined time (for example, when at least one first area is grazed and touched against the user's intention), the function of the electronic device 110 corresponding to at least one first part may not be executed.

In an embodiment, the processor 250 may identify the type of the user interaction for at least one first area on the basis of the change in the areas and/or shapes of at least one first part. For example, the processor 250 may identify touch-down and double-touch for at least one first area, and touches successively input in a predetermined direction on the basis of the change in the areas and/or shapes of at least one first part. The operation in which the processor 250 identifies the type of the user interaction for at least one first area on the basis of the change in the areas and/or shapes of at least one first part is described below in detail.

In operation 304, in an embodiment, the processor 250 may perform the function of the electronic device 110 corresponding to at least one first part on the basis of the determination of the change in at least one first part.

Hereinafter, operation 303 and operation 304 are described in more detail with reference to FIGS. 4 to 8.

Figure 4:
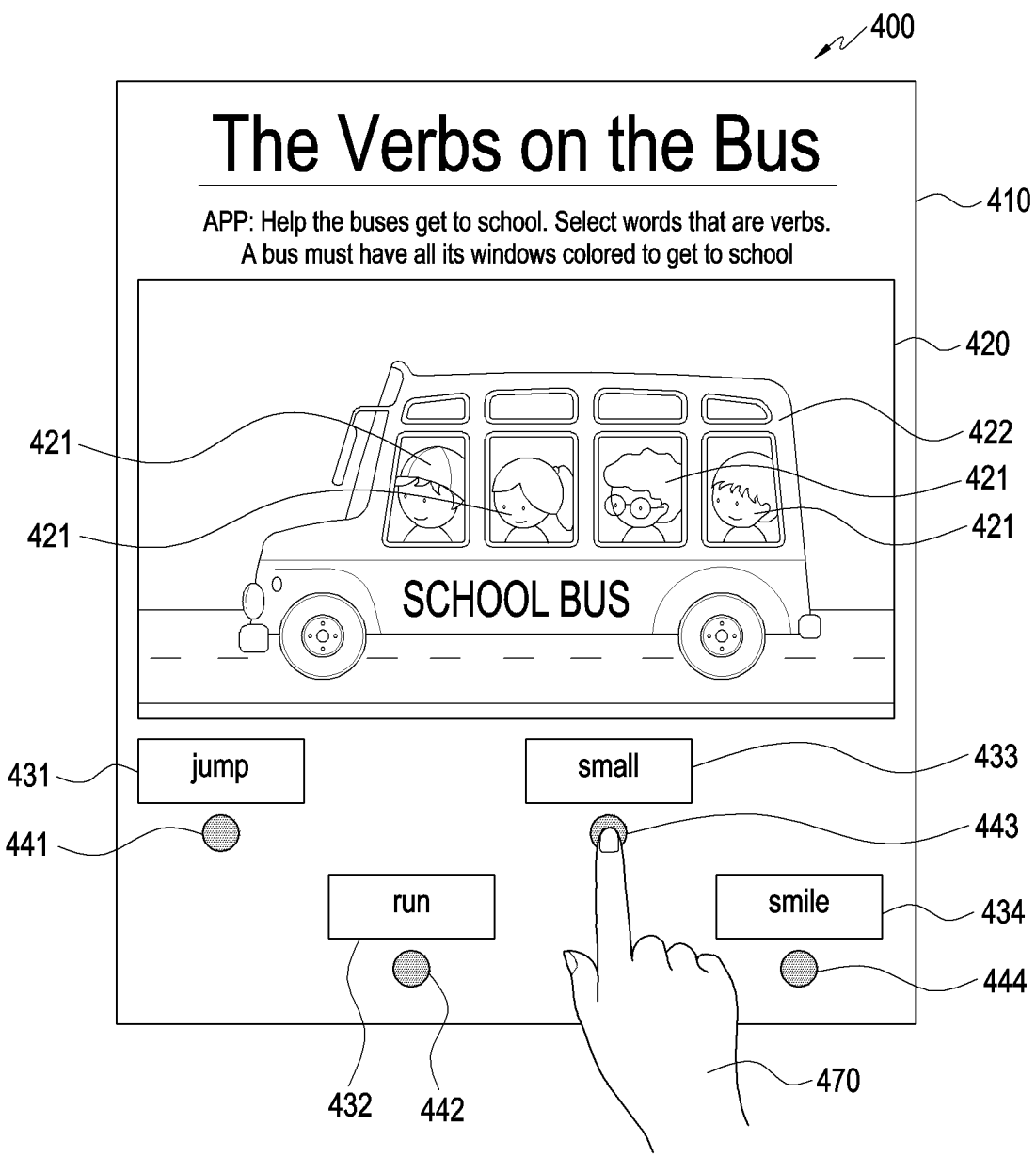
FIG. 4 illustrates a method of performing a function of the electronic device on the basis of a user interaction for at least one first area according to various embodiments.

FIG. 4 is a view 400 illustrating a method of performing the function of the electronic device 110 on the basis of a user interaction for at least one first area according to various embodiments.

In an embodiment, a document 410 (for example, a real book) may include an image 420 including a human image part 421 and a vehicle image part 422, a plurality of first areas (for example, area #5 441, area #6 442, area #7 443, and area #8 444), and a plurality of second areas (for example, area #1 431, area #2 432, area #3 433, and area #4 434). For example, the document 410 may be a document including human image part 421, the vehicle image part 422, the plurality of first areas (for example, area #5 441, area #6 442, area #7 443, and area #8 444), and the plurality of second areas (for example, area #1 431, area #2 432, area #3 433, and area #4 434) printed in the document 410.

In an embodiment, the plurality of second areas (for example, area #1 431, area #2 432, area #3 433, and area #4 434) may correspond to the plurality of first areas (for example, area #5 441, area #6 442, area #7 443, and area #8 444), respectively. The plurality of second areas (for example, area #1 431, area #2 432, area #3 433, and area #4 434) may include text (for example, 'jump', 'run', 'small', and 'smile') guiding functions of the electronic device 110 corresponding the plurality of first parts corresponding to the plurality of first areas (for example, area #5 441, area #6 442, area #7 443, and area #8 444).

In an embodiment, the user may touch (or hide) at least one first area among the plurality of first areas (for example, area #5 441, area #6 442, area #7 443, and area #8 444) by using an input tool (for example, a finger 470). The processor 250 may determine that at least one first part corresponding to at least one touched area is changed. The processor 250 may perform the function of the electronic device 110 corresponding to at least one first part. For example, when area #7 443 is touched by the finger 470 as illustrated in FIG. 4, the processor 250 may determine that an area of a part corresponding to area #7 443 is changed within images (for example, a plurality of frames obtained by capturing the document 410) of the document 410 acquired through the camera (for example, the first camera 121 and/or the second camera 111). When it is determined that the area of the part corresponding to area #7 443 is changed, the processor 250 may display a screen including an image in which the size of the vehicle image part 422 is reduced through the display module 220 as the function of the electronic device 110 corresponding to the part corresponding to area #7 443. In an embodiment, the processor 250 may display an animation showing that the vehicle image part 422 jumps when area #5 441 is touched by the finger 470 which is equal or similar to the function of displaying the screen on which the size of the vehicle image part 422 is reduced by the touch of area #7 443 with the finger 470, display an animation showing that the vehicle image part 422 moves in one direction when area #6 442 is touched by the finger 470, and display an animation showing that a person of the human image part 421 smiles when area #8 444 is touched by the finger 470. However, the function of the electronic device 110 performed by the touch of at least one first area among the plurality of first areas (for example, area #5 441, area #6 442, area #7 443, and area #8 444) is not limited to the above-described examples.

Figure 5:
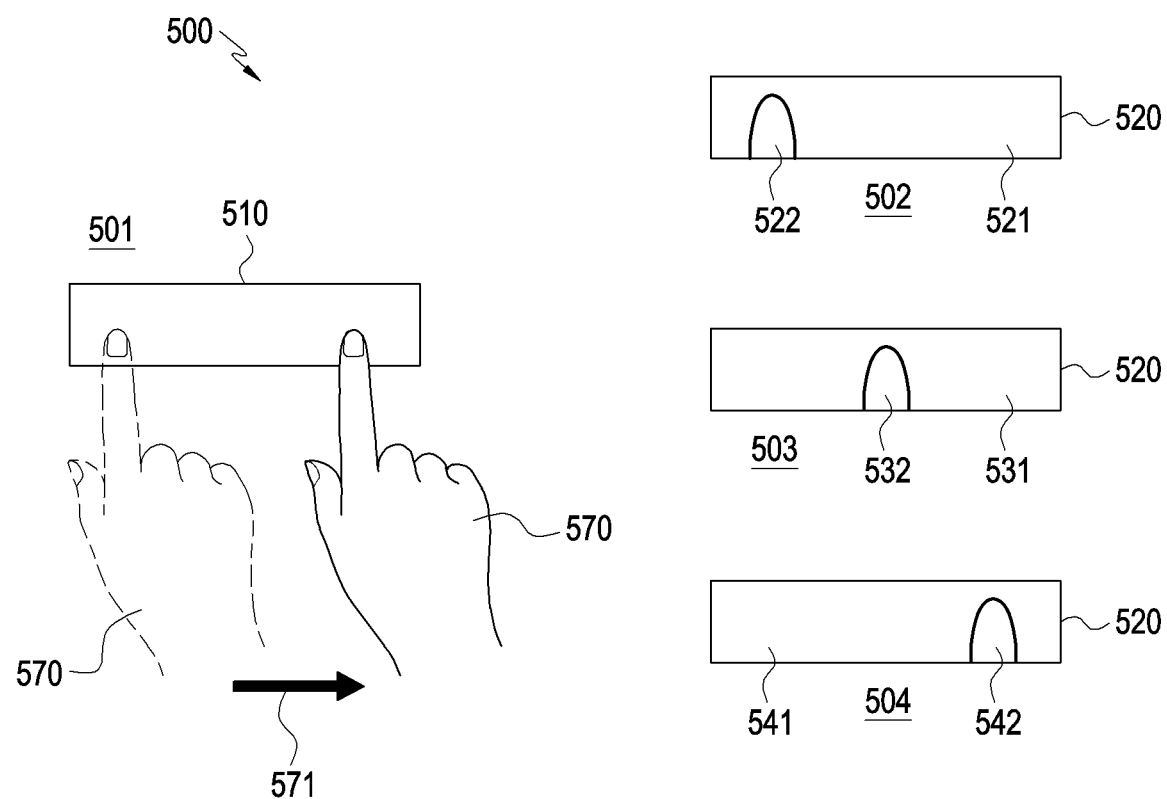
FIG. 5 illustrates a method of detecting touches successively input for at least one first area according to various embodiments.

FIG. 5 is a view 500 illustrating a method of detecting touches successively input for at least one first area according to various embodiments.

Referring to FIG. 5, in an embodiment, the processor 250 may detect touches successively input for at least one first area on the basis of a change in areas of at least one first part corresponding to at least one first area and a change in shapes of at least one first part (and/or a change in a location of a part of which an area is reduced within at least one first part).

In an embodiment, as indicated by reference numeral 501, the user may successively touch at least one first area 510 in a first direction 571 by using a finger 570.

In an embodiment, when at least one first area 510 is successively touched, the processor 250 may determine that at least one first part 520 corresponding to at least one first area 510 is changed.

In an embodiment, as indicated by reference numeral 502, when the user touches (for example, touches down) at least one first area 510, the processor 250 may identify that an area of a part of at least one first part 520 included in the first image is reduced from an area obtained by summing the area of the part 521 corresponding to an area which is not touched by the user within at least one first area 510 and the area of the part 522 corresponding to an area touched by the user within at least one first area 510 to the area of the part 521 and that the shape of at least one first part 520 included in the first image is changed from the shape of a part including the part 521 and the part 522 (For example, the shape formed by edges of the part including the part 521 and the part 522) to the shape of the part 521 (for example, the shape formed by the edge of the part 521). As indicated by reference numeral 503 and reference numeral 504, when the user successively moves the touch in the first direction 571 in the state in which the touch of at least one first area 510 is maintained, the processor 250 may identify that the area of at least one first part 520 included in the first image is maintained to be substantially the same as the area of the part 521 and that the shape of at least one first part 520 included in the first image is successively changed from the shape of the part 521 to shapes of a part 531 and a part 541. In an embodiment, as indicated by reference numeral 502 to reference numeral 504, when the shape of at least one first part 520 included in the first image is successively changed while the area of at least one first part 520 included in the first image is reduced and then maintained, the processor 250 may determine that an interaction of successively touching at least one first area 510 by the user is generated. In an embodiment, when the shape of at least one first part 520 included in the first image is successively changed (for example, when the shape of at least one first part 520 included in the first image is sequentially changed to the shape of the part 531 and the shape of the part 541) while the area of at least one first part 520 included in the first image is maintained, the processor 250 may perform the function of the electronic device 110 corresponding to the successive changes of the at least one first part 520 and the shapes of the at least one first part 520 included in the first image. For example, while the area of at least one first part 520 included in the first image is reduced and then maintained and the shapes of at least one first part 520 included in the first image included in the first image are successively changed in a direction corresponding to the first direction 571, the processor 250 may display a line of which the length gradually increases in the direction corresponding to the first direction 571 through the display module 220.

In an embodiment, as indicated by reference numeral 502, when the user touches at least one first area 510, the processor 250 may identify that the areas of at least one first part 520 included in the first image are reduced from an area obtained by summing the area of the part 521 and the area of the part 522 to the area of the part 521 and identify the location of the part 522 corresponding to the reduced area within at least one first part 520. As indicated by reference numeral 503 and reference numeral 504, when the user successively moves the touch in the first direction 571 in the state in which the touch of at least one first area 510 is maintained, the processor 250 may identify that the areas of at least one first part 520 (for example, each of the areas of the part 531 and the area of the part 541) included in the first image is maintained to be substantially the same as the area of the part 521 and identify locations of the part 532 and the part 542 corresponding to the reduced area in at least one first area 510. In an embodiment, as indicated by reference numeral 502 to reference numeral 504, when the location of the part corresponding to the reduced area is successively changed within at least one first part 520 while the areas of at least one first part 520 included in the first image are reduced and then maintained, the processor 250 may determine that an interaction of successively touching at least one first area 510 by the user is generated. In an embodiment, when the location of the part corresponding to the reduced area within at least one first part 520 is successively changed while the areas of at least one first part 520 are reduced and then maintained, the processor 250 may perform the function of the electronic device 110 corresponding to the change in the location of at least one first part 520 and the part corresponding to the reduced area. For example, while the areas of at least one first part 520 are reduced and then maintained and the location of the part corresponding to the reduced area within at least one first part 520 is successively changed in a direction corresponding to the first direction 571, the processor 250 may display a line of which the length gradually increases in the direction corresponding to the first direction 571.

Figure 6:
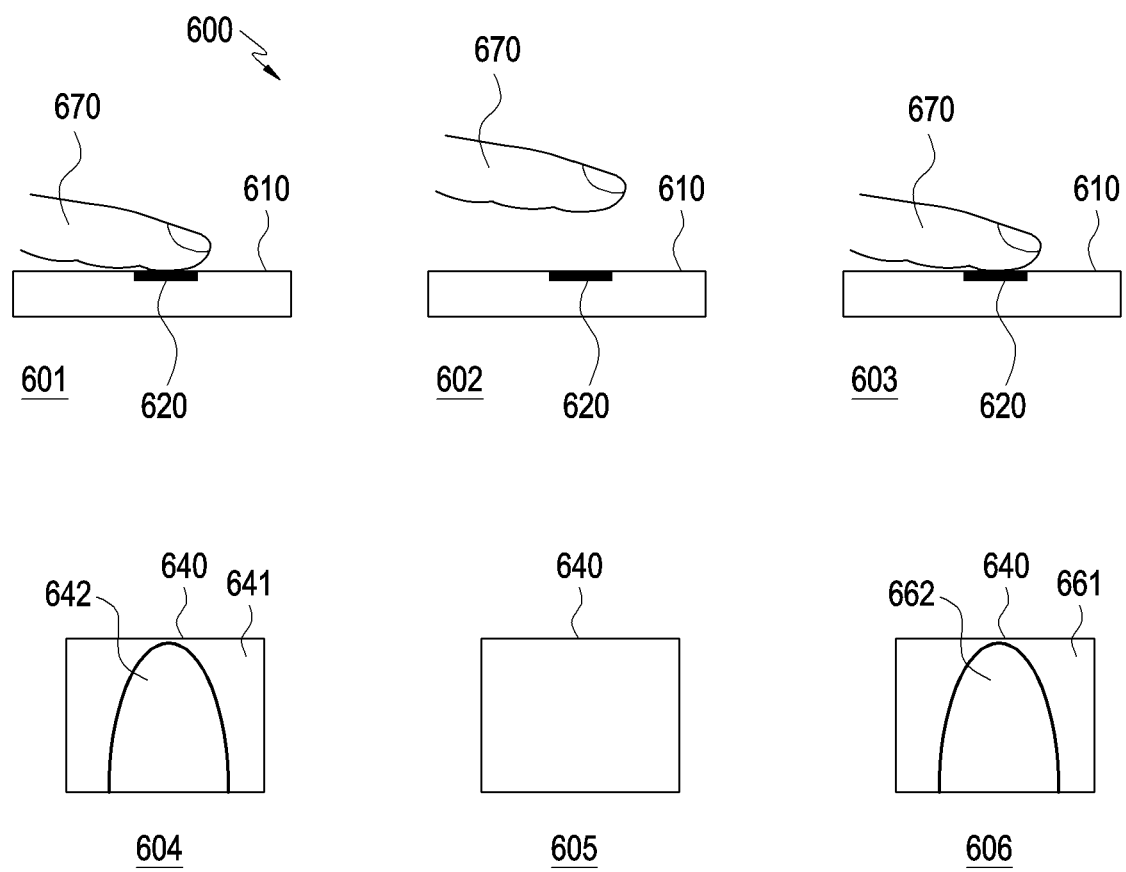
FIG. 6 illustrates a method of detecting a double touch for at least one first area according to various embodiments.

FIG. 6 is a view 600 illustrating a method of detecting a double touch for at least one first area according to various embodiments.

Referring to FIG. 6, in an embodiment, the processor 250 may detect a double touch for at least one first area on the basis of successively changes in the areas of at least one first part.

In an embodiment, as indicated by reference numeral 601, the user may touch-down at least one first area 620 of a document 610 by using a finger 670. When at least one first area 620 is touched by the user's finger 670, the processor 250 may identify that areas of at least one first part 640 included in the first image are reduced from an area obtained by summing an area of a part 641 corresponding to an area which is not touched by the user within at least one first area 620 and an area of a part 642 corresponding to an area touched by the user within at least one first area 620 to the area of the part 641.

In an embodiment, as indicated by reference numeral 602, after touching-down at least one first area 620 of the document 610 by using the finger 670, the user may touch-up the finger 670 from at least one first area 620. When the user's finger 670 performs touch-up from at least one first area 620, the processor 250 may identify that the areas of at least one first part 640 included in the first image increases from the area of the part 641 to the area obtained by summing the area of the part 641 and the area of the part 642. However, it is not limited thereto, and when the user's finger 670 performs touch-up from at least one first area 620, the processor 250 may identify that the areas of at least one first part 640 included in the first image increase from the area of the part 640 to an area between the part 641 and the summed area.

In an embodiment, as indicated by reference numeral 603, after the user's finger 670 performs touch-up from at least one first area 620, the user may touch-down again at least one first area 620 by using the finger 670. When at least one first area 620 is touched-down again by the user, the processor 250 may identify that the areas of at least one first part 640 included in the first image are reduced from the summed area to the area of the part 661.

In an embodiment, as indicated by reference numeral 601 to reference numeral 606, when the areas of at least one first part 640 included in the first image are successively reduced, increased, and reduced, the processor 250 may determine that the user double-touches at least one first area. For example, when a pattern in which the areas of at least one first part 640 included in the first image are successively reduced, increased, and reduced is identified, the processor 250 may determine that the user double-touches at least one first area.

In an embodiment, when the areas of at least one first part 640 included in the first image are successively reduced, increased, and reduced within a predetermined time, the processor 250 may determine that the user double-touches at least one first area.

In an embodiment, when the user double-touches at least one first area, the processor 250 may perform the function of the electronic device 110 corresponding to the double touch for at least one first area.

Figure 7:
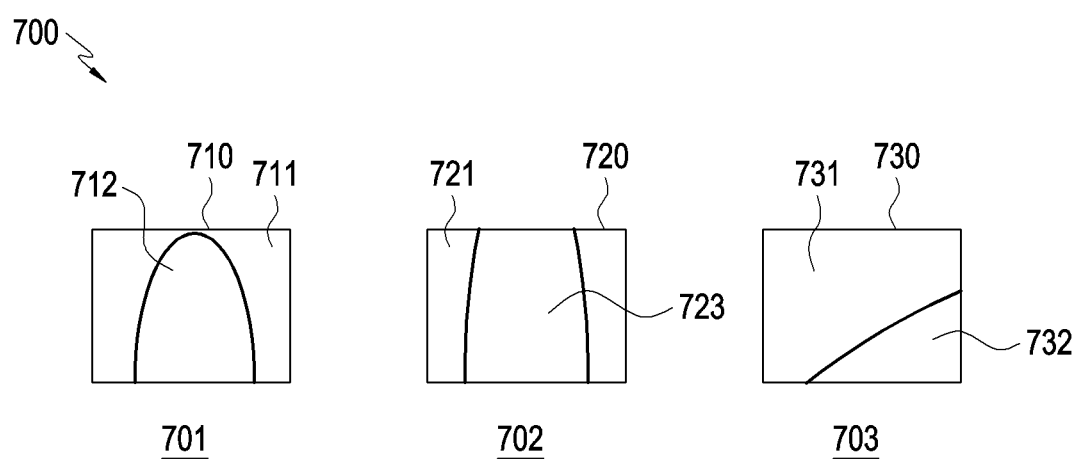
FIG. 7 illustrates a method of detecting a user interaction on the basis of shapes of at least one first part according to various embodiments.

FIG. 7 is a view 700 illustrating a method of detecting a user interaction on the basis of shapes of at least one first part according to various embodiments.

Referring to FIG. 7, in an embodiment, the processor 250 may determine whether to execute the function of the electronic device 110 corresponding to at least one first part on the basis of shapes (for example, forms) of at least one first part included in the first image (for example, identified within the first image).

In an embodiment, when the shapes of at least one first part correspond to predetermined shapes (for example, predetermined shapes stored in the memory 240), the processor 250 may determine to perform the function of the electronic device 110 corresponding to at least one first part. For example, in reference numeral 701 and reference numeral 702, when at least a part of the shapes of at least one first part 710 and 720 included in the first image corresponds to a shape of a part of the finger (for example, a fingertip) as indicated by reference numeral 711 or reference numeral 721, the processor 250 may determine to execute the function of the electronic device 110 corresponding to at least one first part. In another example, in reference numeral 703, when a part of the shapes of at least one first part 730 included in the first image does not correspond to the shape of the part of the finger (for example, the fingertip) as indicated by reference numeral 731, the processor 250 may determine to not execute the function of the electronic device 110 corresponding at least one first part. In another example, in reference numeral 701 and reference numeral 702, when a shape of a part of which the area is reduced within at least one first part 710 and 720 corresponds to the shape of the part of the finger as indicated by reference numeral 712 or reference numeral 723, the processor 250 may determine to execute the function of the electronic device 110 corresponding to at least one first part. In another example, in reference numeral 703 when the shape of the part of which the area is reduced within at least one first part 730 included in the first image does not correspond to the shape of the part of the finger as indicated by reference numeral 732, the processor 250 may determine to not execute the function of the electronic device 110 corresponding at least one first part.

Figure 8:
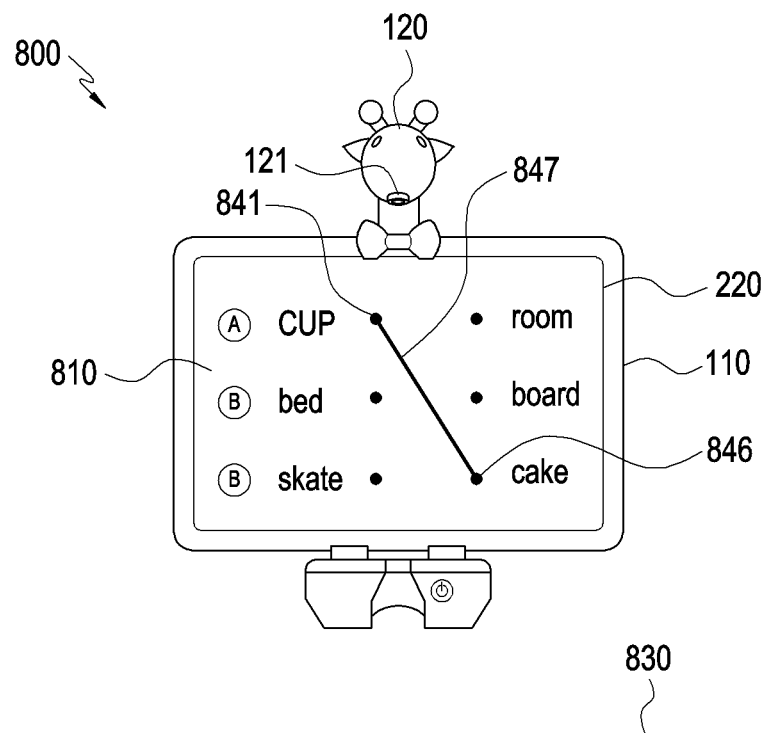
FIG. 8 illustrates a method of performing a function of the electronic device on the basis of a user interaction for a plurality of first areas.
Figure 8:
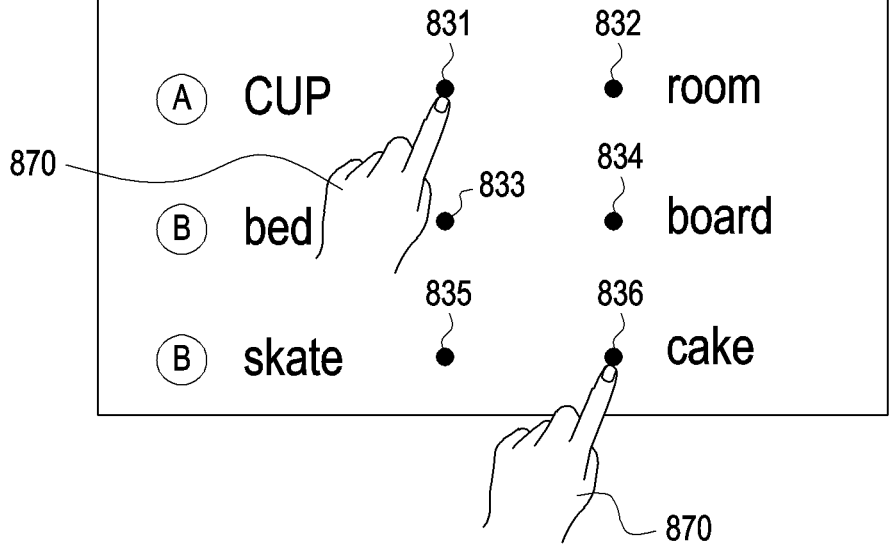

FIG. 8 is a view 800 illustrating a method of performing the function of the electronic device 110 on the basis of a user interaction for a plurality of first areas according to various embodiments.

Referring to FIG. 8, in an embodiment, the processor 250 may perform the function of the electronic device 110 corresponding to a change in a plurality of first parts. For example, in FIG. 8, a document 830 may include a plurality of first areas (for example, area #1 831, area #2 832, area #3 833, area #4 834, area #5 835, and area #6 836). The processor 250 may display a screen 810 corresponding to the document 830 (for example, content of the document 830) through the display module 220. When the user (for example, a user's finger 870) successively touches area #1 831 and area #6 836 within a predetermined time, the processor 250 may determine that a plurality of first parts 841 and 846 corresponding to area #1 831 and area #6 836 are successively changed within the first image acquired through the camera module 230 (for example, the first camera 121). When it is determined that the plurality of first parts 841 and 846 corresponding to area #1 831 and area #6 836 are successively changed, the processor 250 may display a line 847 connecting the plurality of first parts 841 and 846 corresponding to area #1 831 and area #6 836 through the display module 220 as the function of the electronic device 110. However, the function of the electronic device 110 corresponding to the change in the plurality of first parts is not limited to the above-described example.

Figure 9:
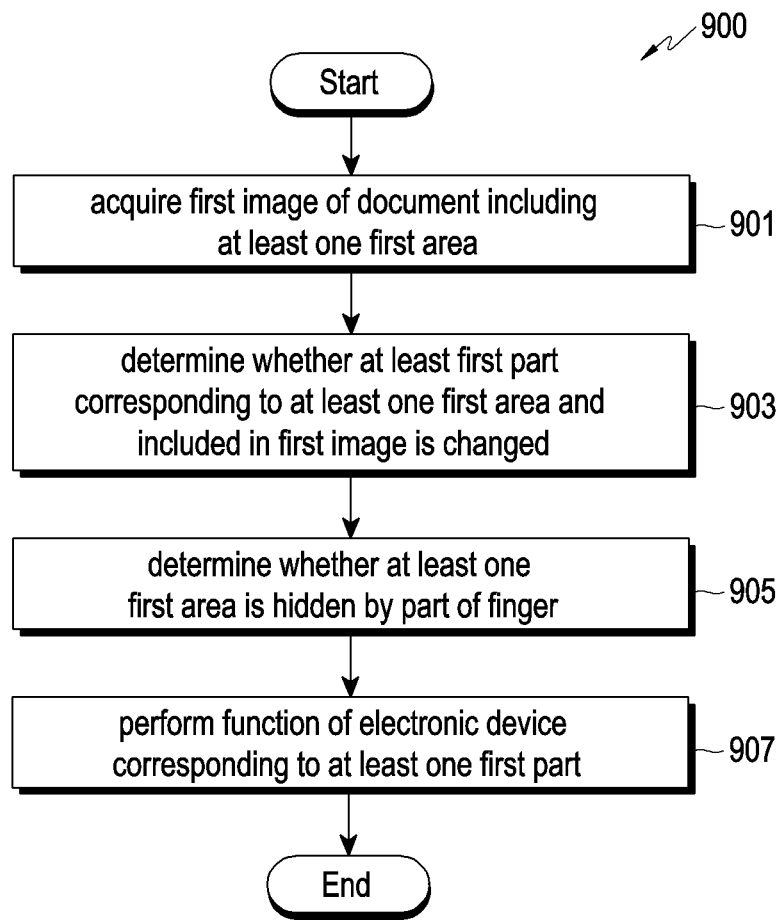
FIG. 9 is a flowchart illustrating a method of detecting a user interaction according to various embodiments.

FIG. 9 is a flowchart 900 illustrating a method of detecting a user interaction according to various embodiments.

Figure 10:
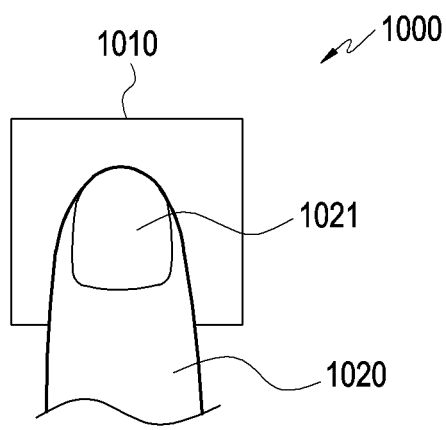
FIG. 10 illustrates a method of detecting a user interaction according to various embodiments.

FIG. 10 is a view 1000 illustrating a method of detecting a user interaction according to various embodiments.

Referring to FIGS. 9 and 10, FIGS. 9 and 10 illustrate a method of performing the function of the electronic device 110 on the basis of whether at least one first part is changed and whether at least one first area is hidden (e.g. covered) by a finger.

In operation 901, in an embodiment, the processor 250 may acquire a first image of a document including at least one first area through a camera (for example, the first camera 121 and/or the second camera 111).

Since at least some of operation 901 are the same as or similar to at least some of operation 301 of FIG. 3, a detailed description thereof is omitted.

In operation 903, in an embodiment, the processor 250 may determine whether at least one first part corresponding to at least one first area and included in the first image is changed.

Since at least some of operation 903 are the same as or similar to at least some of operation 303 of FIG. 3, a detailed description thereof is omitted.

In operation 905, in an embodiment, the processor 250 may determine whether at least one first area is hidden (e.g. covered) by the finger. For example, when it is determined that at least one first part is changed in operation 903, the processor 250 may determine whether at least one first area is hidden by the finger.

In an embodiment, as illustrated in FIG. 10, the user may touch at least one first area 1010 included in the document by using the tip (for example, a part including a nail 1021) of a finger 1020. The processor 250 may identify that at least one first part overlaps an image part for the part including the nail 1021 on the basis of the first image for at least one first area 1010 acquired through the camera (for example, the first camera 121 and/or the second camera 111). When it is identified that at least one first part within the first image overlaps the image part for the part including the nail 1021, the processor 250 may determine that at least one first area is hidden by the finger.

In operation 907, in an embodiment, when it is determined that at least one first area is hidden by the finger, the processor 250 may perform the function of the electronic device 110 corresponding to at least one first part.

Since at least some of the operation in which the processor 250 performs the function of the electronic device 110 corresponding to at least one first part in operation 907 are the same as or similar to at least some of the operation in which the processor 250 performs the function of the electronic device 110 corresponding to at least one first part in operation 304 of FIG. 3, a detailed description thereof is omitted.

In an embodiment, the processor 250 performs the function of the electronic device 110 on the basis of not only the change in at least one first part but also whether at least one first area is hidden by the finger, so that the electronic device 100 may detect a more accurate user interaction for at least one first area.

Figure 11:
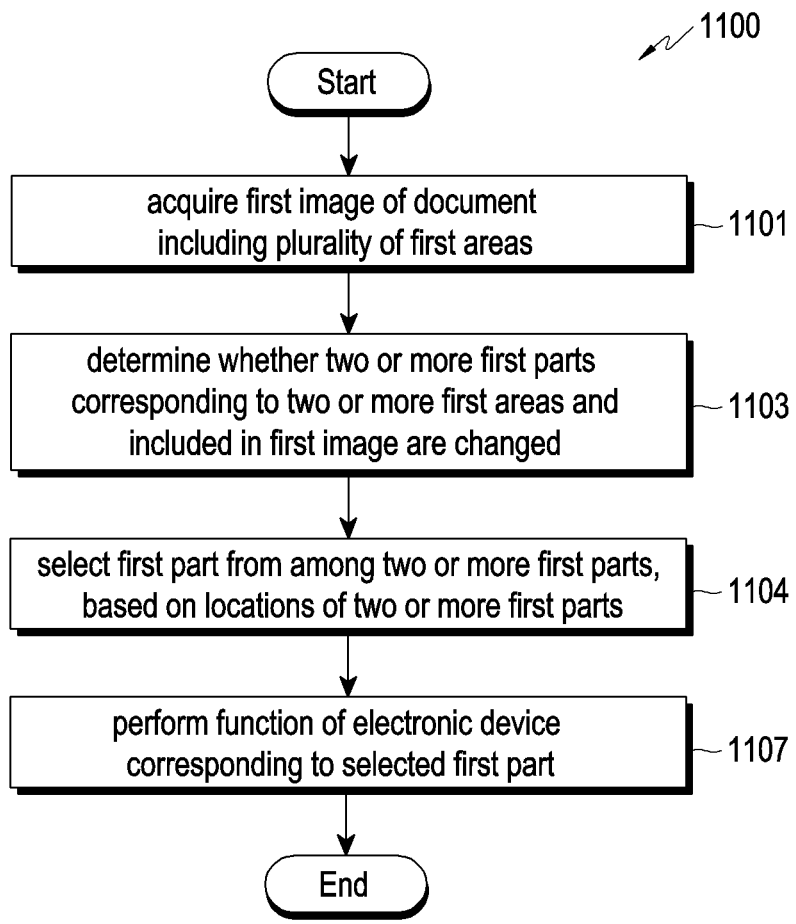
FIG. 11 is a flowchart illustrating a method of detecting a user interaction according to various embodiments.

FIG. 11 is a flowchart 1100 illustrating a method of detecting a user interaction according to various embodiments.

Figure 12:
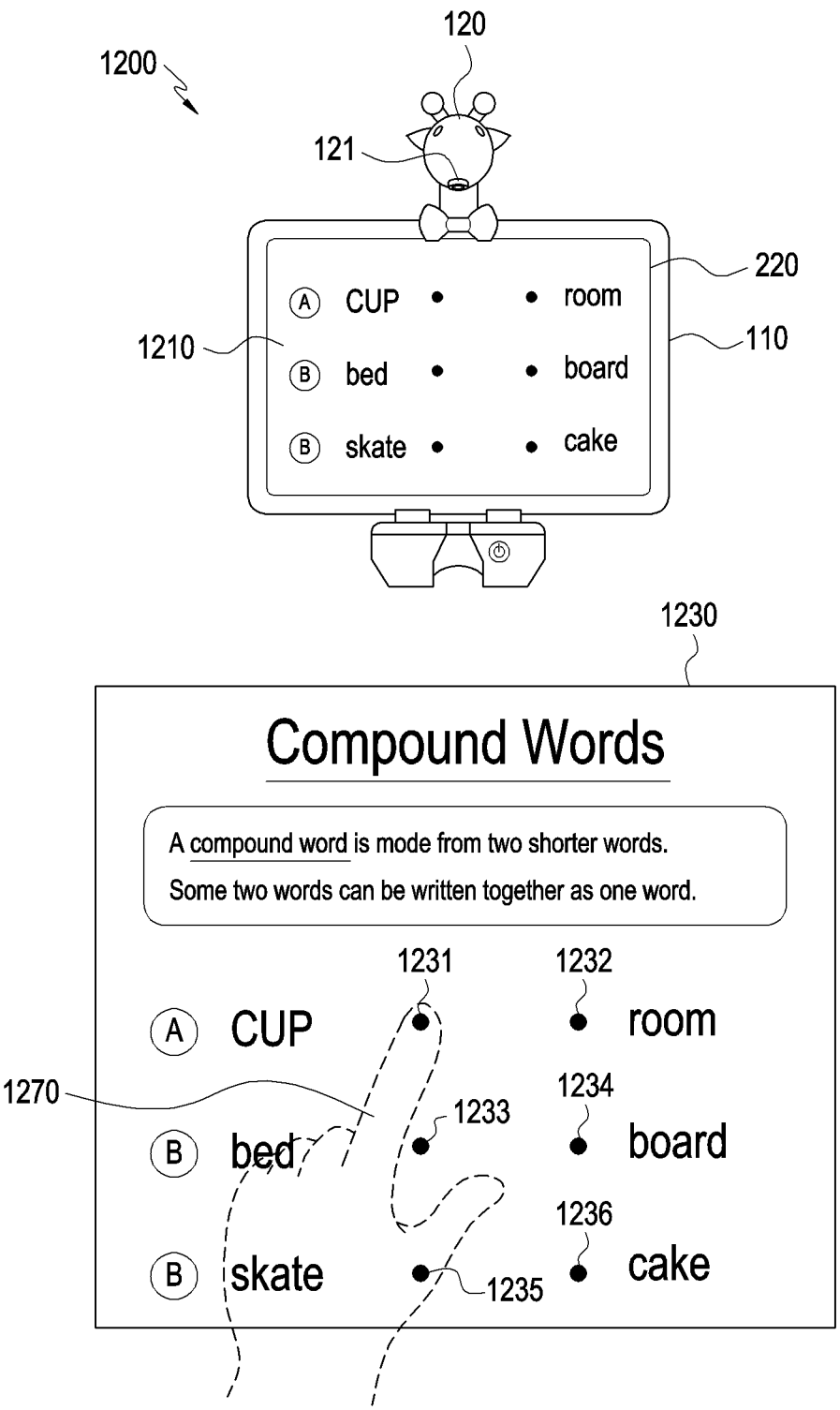
FIG. 12 is a flowchart illustrating a method of detecting a user interaction according to various embodiments.

FIG. 12 is a view 1200 illustrating a method of detecting a user interaction according to various embodiments.

Figure 13:
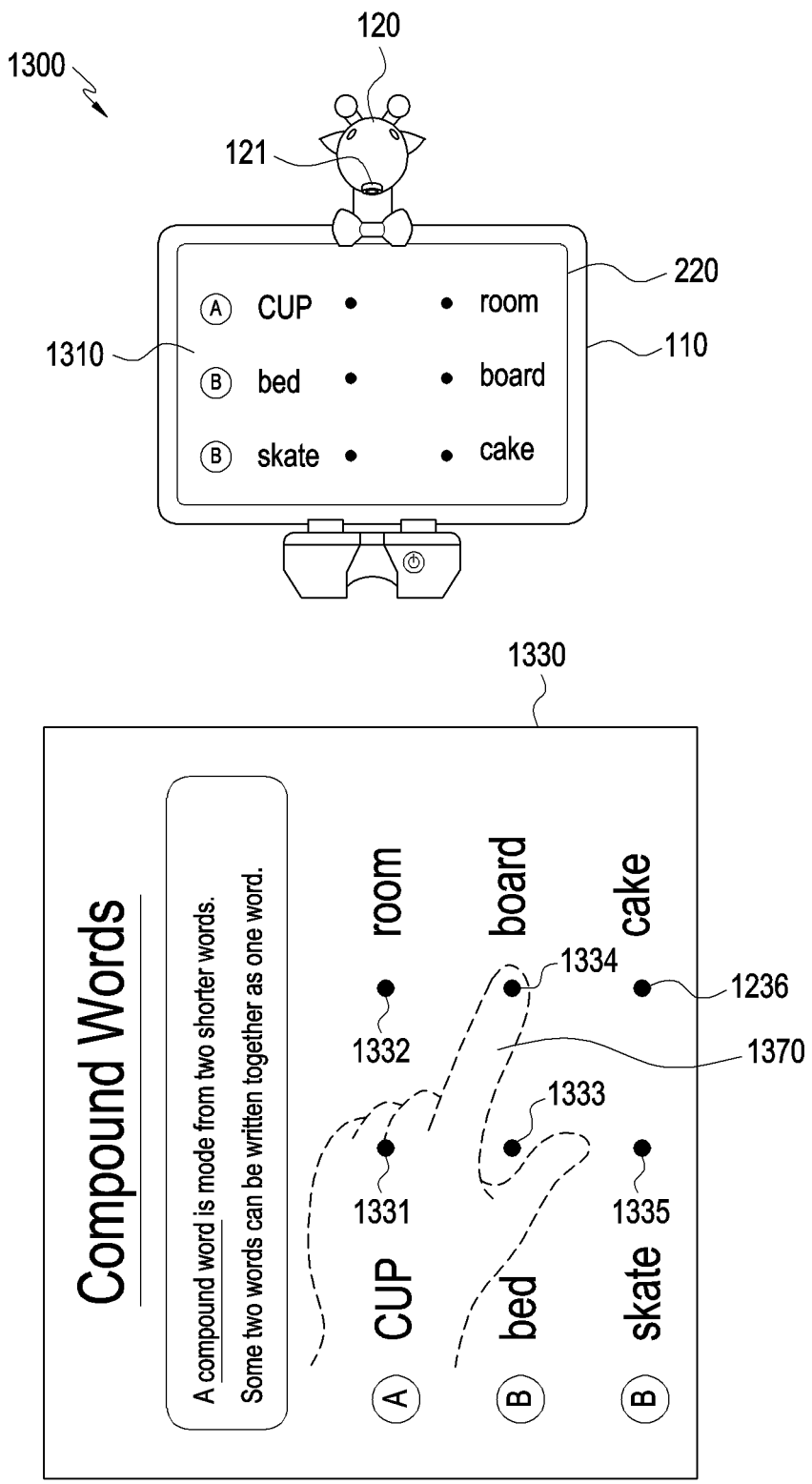
FIG. 13 illustrates a method of detecting a user interaction according to various embodiments.

FIG. 13 is a view 1300 illustrating a method of detecting a user interaction according to various embodiments.

Referring to FIGS. 11 to 13, in operation 1101, in an embodiment, the processor 250 may acquire a first image of a document including a plurality of first areas through a camera (for example, the first camera 121 and/or the second camera 111).

Since at least some of the operation in which the processor 250 acquires the first image of the document including the plurality of first areas through the camera (for example, the first camera 121 and/or the second camera 111) in operation 1101 are the same as or similar to the operation in which the processor 250 acquires the first image of the document including at least one first area through the camera (for example, the first camera 121 and/or the second camera 111) in operation 301 of FIG. 3, a detailed description is omitted.

In operation 1103, in an embodiment, the processor 250 may determine whether two or more first parts corresponding to two or more first areas among the plurality of first areas and included in the first image are changed. For example, among the plurality of first areas included in the document, two or more first areas may be hidden by the user. In this case, the processor 250 may determine that the two or more first parts corresponding to the two or more first areas are changed on the basis of the first image for the document.

In operation 1104, in an embodiment, the processor 250 may select a first part (for example, one first part) from among two or more first parts on the basis of locations of two or more first parts. For example, when it is determined that the two or more first parts corresponding to the two or more first areas are changed, the processor 250 may select one first part from among two or more first parts on the basis of location of two or more first parts.

In an embodiment, the processor 250 may select a first part corresponding to a first area disposed at the uppermost part of the two or more first areas within the document from among the two or more first parts. For example, in FIG. 12, a document 1230 may include a plurality of first areas (for example, area #1 1231, area #2 1232, area #3 1233, area #4 1234, area #5 1235, and area #6 1236). The processor 250 may display a screen 1210 corresponding to the document 1230 (for example, content of the document 1230) through the display module 220. When the user (for example, a user's finger 1270) hides area #1 1231 and area #5 1235 as the two or more first areas among the plurality of first areas (for example, area #1 1231, area #2 1232, area #3 1233, area #4 1234, area #5 1235, and area #6 1236), the processor 250 may select a first part corresponding to area #1 1231 disposed at the uppermost part within the document 1230 among a first part corresponding to area #1 1231 and a first part corresponding to area #5 1235 on the basis of the first image for the document 1230 acquired through the camera (for example, the first camera 121).

In an embodiment, the processor 250 may select a first part located at the uppermost part within the first image for the document from among the two or more first parts. For example, in FIG. 13, a document 1330 may include a plurality of first areas (for example, area #1 1331, area #2 1332, area #3 1333, area #4 1334, area #5 1335, and area #6 1336). The processor 250 may display a screen 1310 corresponding to the document 1330 (for example, content of the document 1330) through the display module 220. When the user (for example, a user's finger 1370) hides area #1 1331 and area #4 1334 as the two or more first areas among the plurality of first areas (for example, area #1 1331, area #2 1332, area #3 1333, area #4 1334, area #5 1335, and area #6 1336), the processor 250 may select a first part corresponding to area #4 1334 disposed at the uppermost part within the first image among a first part corresponding to area #1 1331 and a first part corresponding to area #4 1334 on the basis of the first image for the document 1330 acquired through the camera (for example, the first camera 121).

In operation 1107, in an embodiment, the processor 250 may perform the function of the electronic device 110 corresponding to the first part selected in operation 1104. For example, even when it is determined that the two or more first parts are changed, the processor 250 may perform the function of the electronic device 110 corresponding to the selected first part and may not perform the function of the electronic device 110 corresponding to the first part which is not selected.

In an embodiment, operation 1104 and operation 1107 may be the operation included in operation 304 of FIG. 3.

In an embodiment, when two or more first parts are changed, the processor 250 may prevent the function of the electronic device 110 corresponding to the first area hidden by the user from being incorrectly performed unlike a user's intention by performing only the function of the electronic device 110 corresponding to one first part on the basis of locations of two or more first parts.

Figure 14:
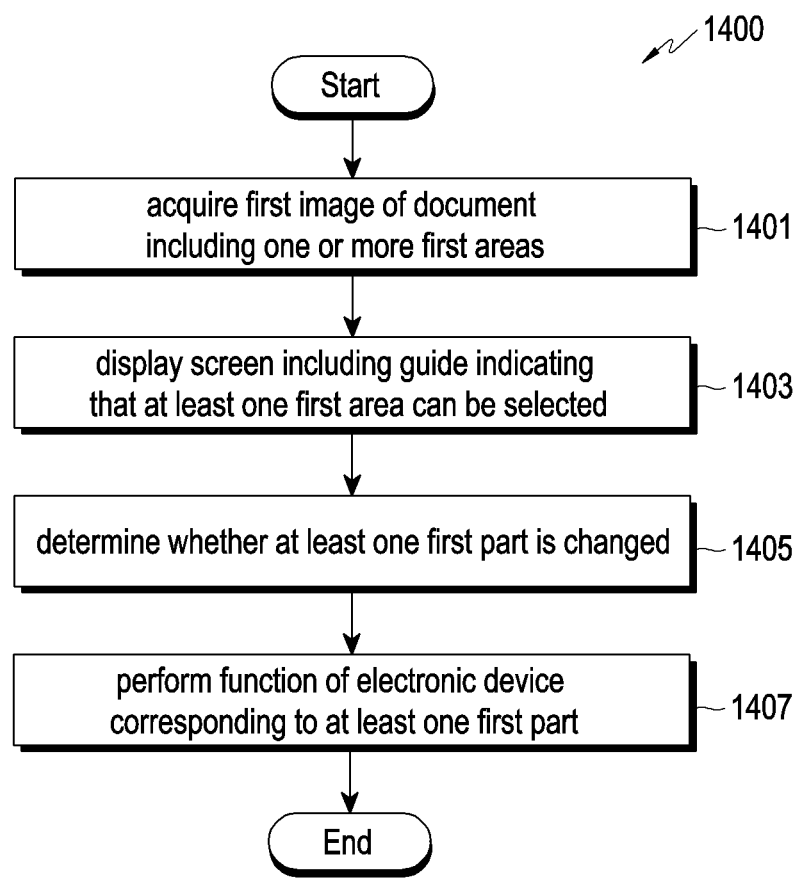
FIG. 14 is a flowchart illustrating a method of detecting a user interaction according to various embodiments.

FIG. 14 is a flowchart 1400 illustrating a method of detecting a user interaction according to various embodiments.

Figure 15:
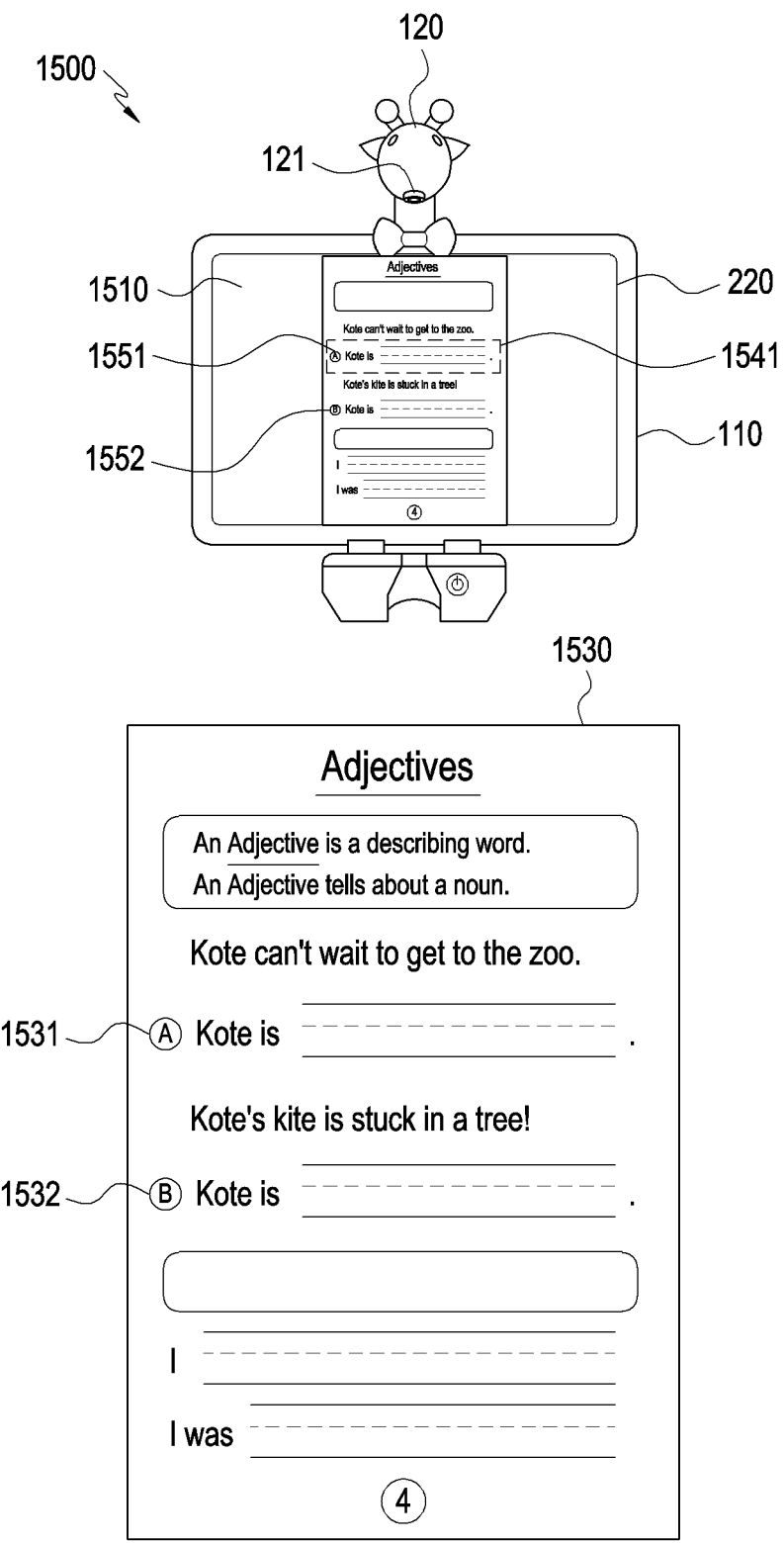
FIG. 15 is a flowchart illustrating a method of detecting a user interaction according to various embodiments.

FIG. 15 is a view 1500 illustrating a method of detecting a user interaction according to various embodiments.

Referring to FIGS. 14 and 15, in an embodiment, the processor 250 may acquire a first image of a document including one or more first areas through a camera (for example, the first camera 121 and/or the second camera 111) in operation 1401.

Since at least some of the operation in which the processor 250 acquire the first image of the document including one or more first areas through the camera in operation 1401 are the same as or similar to the operation in which the processor 250 acquires the first image of the document including at least one first area through the camera in operation 301 of FIG. 3, a detailed description is omitted.

In operation 1403, the processor 250 may display a screen including a guide indicating that at least one first area can be selected among the one or more first areas through the display module 220.

In an embodiment, as illustrated in FIG. 15, the processor 250 may display a screen 1510 related to a first image of a document 1530 including one or more first areas 1531 and 1532 through the display module 220. Objects 1551 and 1552 included in the screen 1510 may indicate one or more first parts corresponding to one or more first areas 1531 and 1532. For example, the objects 1551 and 1552 included in the screen 1510 may correspond to one or more first parts corresponding to the one or more first areas 1531 and 1532. The processor 250 may display an indication 1541 surrounding the object 1551 among the objects 1551 and 1552 included in the screen 1510 through the display module 220 as a guide indicating that the first area 1531 is an area which can be selected by the user among the one or more first areas 1531 and 1532. However, a method of indicating that the first area 1531 among the one or more first areas 1531 and 1532 is an area which can be selected by the user is not limited to the example of displaying the indication 1541.

In an embodiment, the processor 250 may change the area which can be selected among one or more first areas according to a progress situation of an application related to the document. For example, the processor 250 may display the indication 1541 indicating that the first area 1531 can be selected by the user among the one or more first areas 1531 and 1532 through the display module 220 in FIG. 15. The processor 250 may perform the function of the electronic device 110 corresponding to the first part (the first part corresponding to the first area 1531) on the basis of the change in the first part corresponding to the first area 1351. After performing the function of the electronic device 110, the processor 250 may display an indication (not shown) indicating that the second area 1532 can be selected by the user among the one or more first areas 1531 and 1532 through the display module 220.

In operation 1405, in an embodiment, the processor 250 may determine whether at least one first part corresponding to the first area which can be selected is changed on the basis of the first image.

In an embodiment, the processor 250 may determine whether the first part indicated by the guide (for example, the indication 1541) is changed within the first image. For example, the processor 250 may determine whether an area and/or shape of the first part indicated by the guide are changed within the first image.

In operation 1407, in an embodiment, the processor 250 may perform the function of the electronic device 110 corresponding to at least one first part on the basis of determination that at least one first part is changed. For example, in FIG. 15, the processor 250 may perform the function of the electronic device 110 corresponding to the object 1551 (or the first part corresponding to the first area 1531) indicated by the guide (for example, the indication 1541).

In an embodiment, even though the first part corresponding to the first area which is not indicated as the area which can be selected by the guide among one or more first areas is changed, the processor 250 may not perform the function of the electronic device 110 corresponding to the first part. For example, in FIG. 15, even though the first area 1532 corresponding to the object 1552 which is not indicated by the guide (for example, the indication 1541) is hidden by the user (for example, even through a user interaction for the user is detected in the first area 1532), the processor 250 may not perform the function of the electronic device 110 corresponding to the first part (the first part corresponding to the first area 1532).

Figure 16:
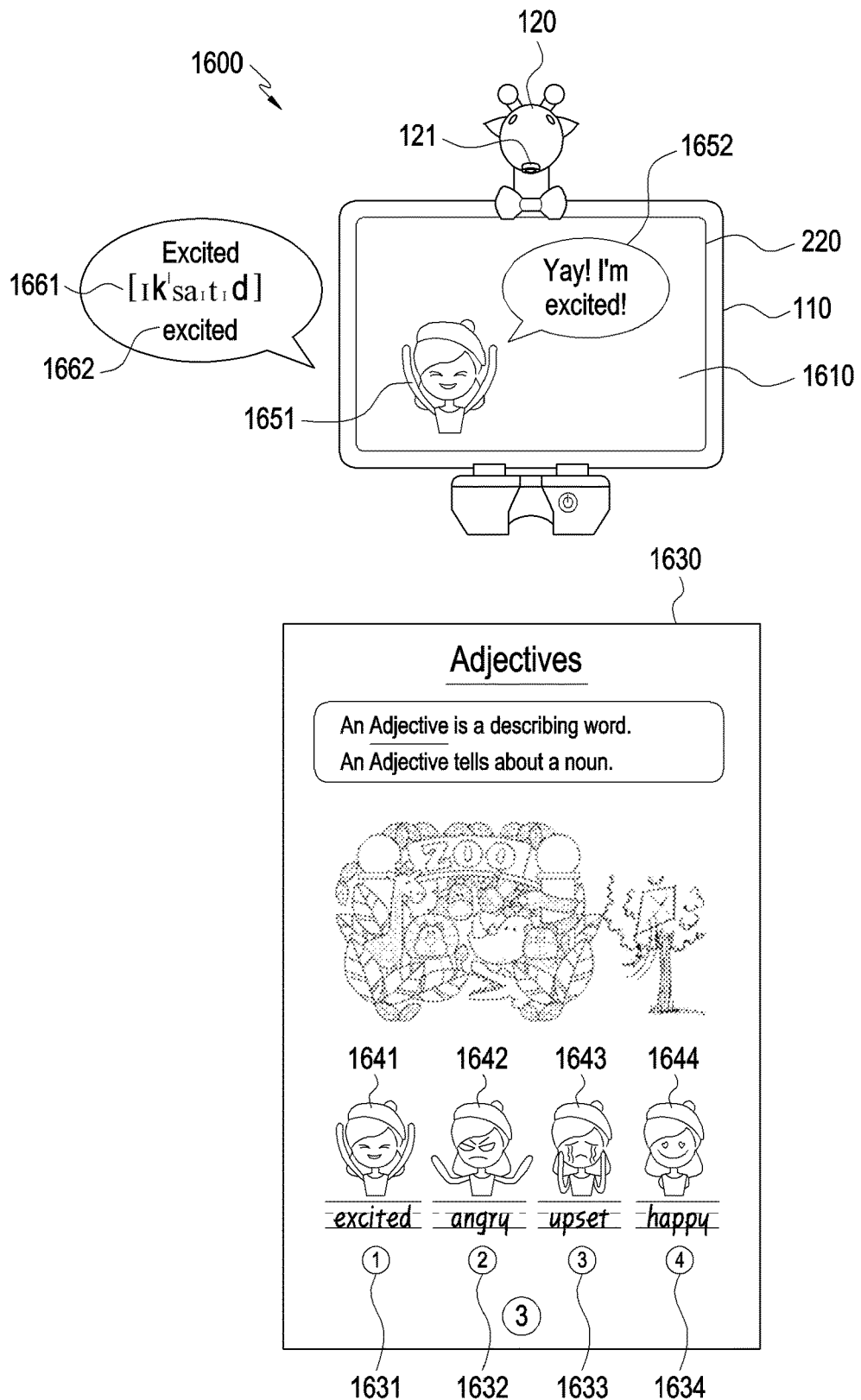
FIG. 16 illustrates a method of performing a function of the electronic device on the basis of a user interaction according to various embodiments.

FIG. 16 is a view 1600 illustrating a method of performing the function of the electronic device 110 on the basis of a user interaction according to various embodiments.

Referring to FIG. 16, in an embodiment, a document 1630 may include a plurality of first areas (for example, area #1 1631, area #2 1632, area #3 1633, area #4 1634, area #5 1641, area #6 1642, area #7 1643, and area #8 1644).

In an embodiment, the processor 250 may perform the function of the electronic device 110 corresponding to an area in which the user interaction is detected (for example, touched by the user). For example, when a touch for area #5 1641 (or area #1 1631) including the word "excited" is detected (for example, when it is determined that the first part corresponding to area #5 1641 is changed), the processor 250 may display a screen 1610 including text 1652 containing the word "excited" and an image 1651 through the display module 220 and output audio corresponding to the word "excited" (for example, pronunciation 1661 and meaning 1662 of the word "excited") through a sound output device (for example, a speaker). In another example, although not illustrated in FIG. 16, when a touch for area #6 1642 (or area #2 1632) is detected, the processor 250 may display a screen including text containing the word "angry" and an image through the display module 220 and output audio corresponding to the word "angry" (for example, pronunciation and meaning of the word "angry") through the sound output device.

Figure 17A:
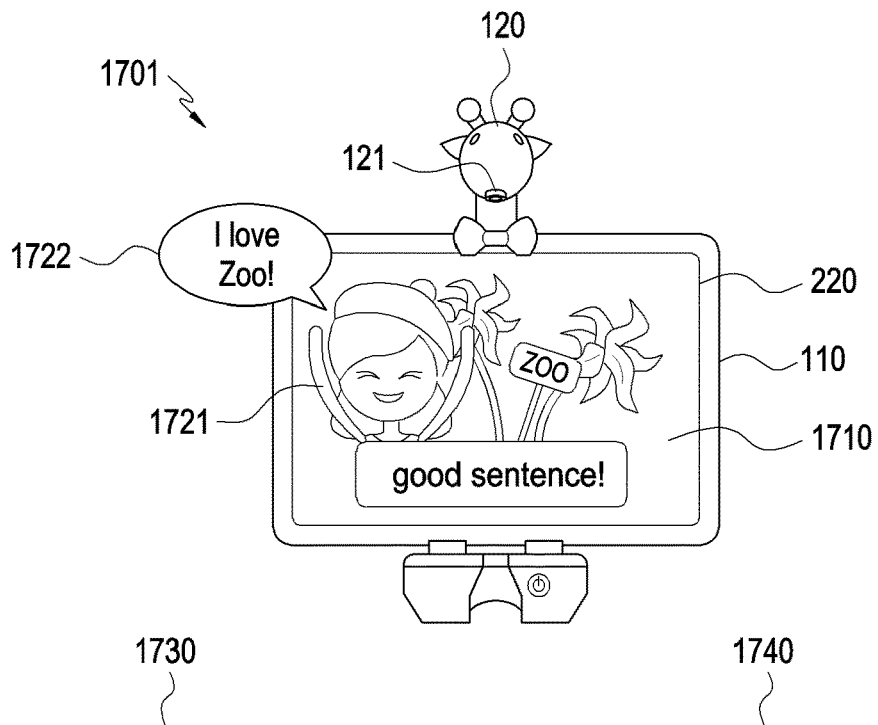
FIG. 17A illustrates a method of performing a function of the electronic device on the basis of a user interaction according to various embodiments.
Figure 17A:
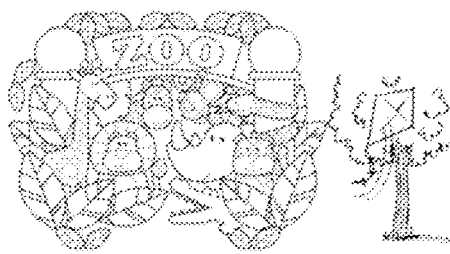
Figure 17A:
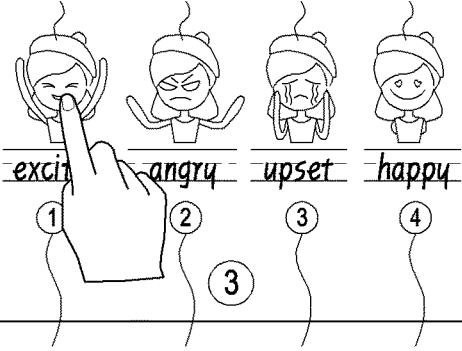
Figure 17B:
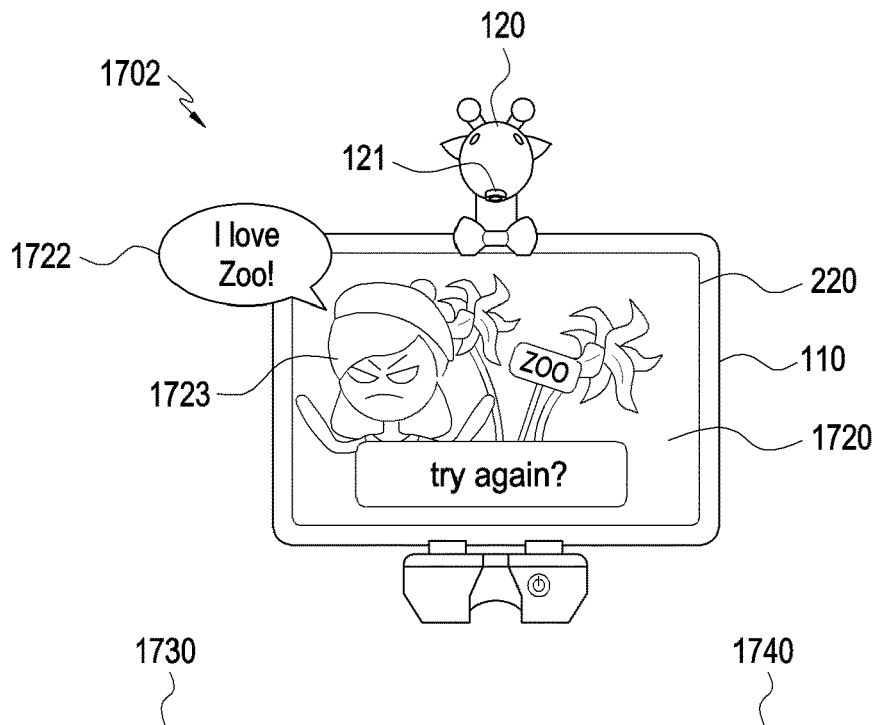
FIG. 17B illustrates a method of performing a function of the electronic device on the basis of a user interaction according to various embodiments.

FIGS. 17A and 17B are views 1701 and 1702 illustrating a method of performing the function of the electronic device 110 on the basis of a user interaction according to various embodiments.

Referring to FIGS. 17A and 17B, in an embodiment, a document may include a first page 1730 including a plurality of first areas (for example, area #1 1741, area #2 1742, area #3 1743, area #4 1744, area #5 1751, area #6 1752, area #7 1753, and area #8 1754) and a second page 1740 including a plurality of first areas (for example, area #9 1731 and area #10 1732).

In an embodiment, when a user interaction for area #9 1731 among area #9 1731 and area #10 1732 is detected and then a user interaction for area #5 1751 (or area #1 1741) including the word "excited" suitable for a sentence (for example, "Kate can't wait to get to the zoo") corresponding to area #9 1731 and included in the document is detected as illustrated in FIG. 17A, the processor 250 may display a screen 1710 including an image 1721 indicating that the word "excited" suitable for the sentence is selected through the display module 220 and output audio 1722 configured to be output when the word "excited" suitable for the sentence is selected through the sound output module.

In an embodiment, when a user interaction for area #9 1731 among area #9 1731 and area #10 1732 is detected and then a user interaction for area #6 1752 (or area #2 1742) including the word "angry" which is not suitable for the sentence (for example, "Kate can't wait to get to the zoo") corresponding to area #9 1742 and included in the document is detected as illustrated in FIG. 17B, the processor 250 may display a screen 1720 including an image 1723 indicating that the word "angry" which is not suitable for the sentence is selected through the display module 220 and output audio 1724 configured to be output when the word "angry" which is not suitable for the sentence is selected through the sound output module.

Figure 18A:
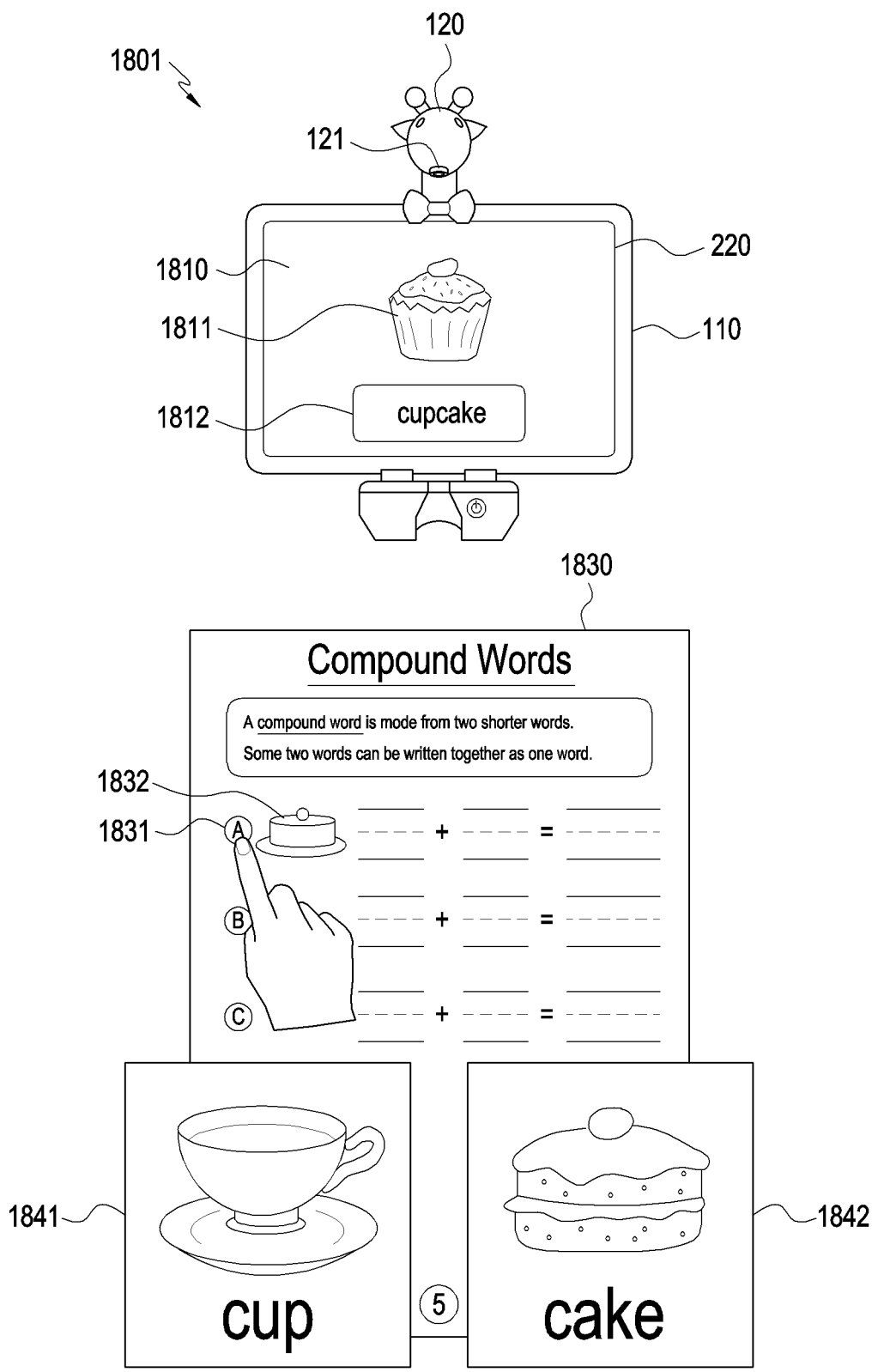
FIG. 18A illustrates a method of performing a function of the electronic device on the basis of a user interaction according to various embodiments.
Figure 18B:
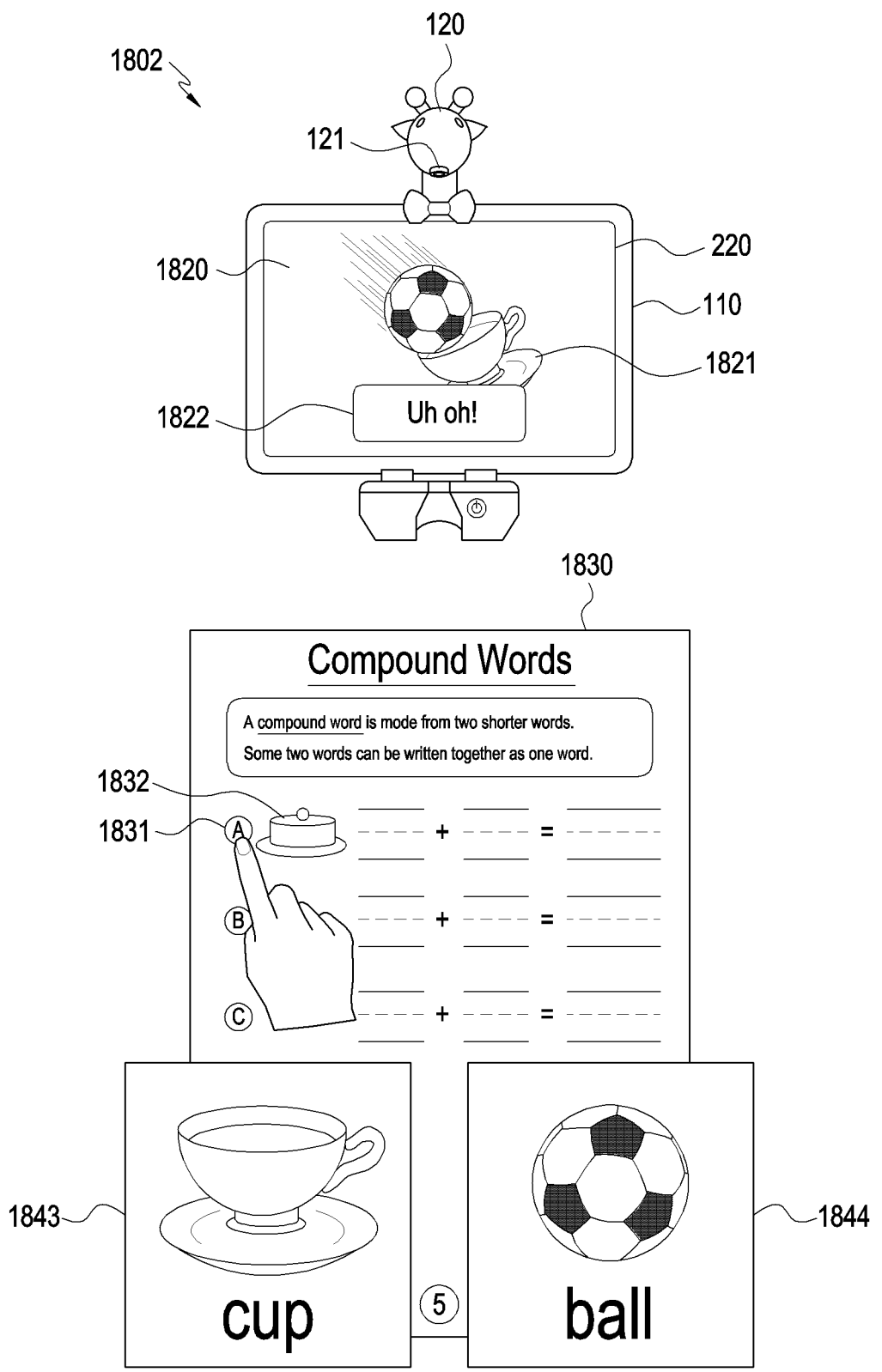
FIG. 18B illustrates a method of performing a function of the electronic device on the basis of a user interaction according to various embodiments.

FIGS. 18A and 18B are views 1801 and 1802 illustrating a method of performing the function of the electronic device 110 on the basis of a user interaction according to various embodiments.

Referring to FIGS. 18A and 18B, in an embodiment, a document 1830 may include at least one first area (for example, area #1 1831) and an image 1832 corresponding to at least one first area.

In an embodiment, after a user interaction for area #1 1831 is detected, the processor 250 may acquire images for two markers (for example, picture card #1 1841 and picture #2 1842) suitable for the image 1832 corresponding to at least one first area through a camera (for example, the first camera 121) as illustrated in FIG. 18A. The processor 250 may identify that a combination of the cup indicated by picture card #1 1841 and the cake indicated by picture card #2 1842 corresponds to a cupcake indicated by the image 1832 on the basis of the acquired image. When the combination of the cup indicated by picture card #1 1841 and the cake indicated by picture card #2 1842 corresponds to the cupcake indicated by the image 1832, the processor 250 may display a screen 1810 including an image 1811 and text 1812 (for example, "cupcake") configured to be displayed when the combination of the cup indicated by picture card #1 1841 and the cake indicated by picture card #2 1842 corresponds to the cupcake indicated by the image 1832.

In an embodiment, after a user interaction for area #1 1831 is detected, the processor 250 may acquire images for two markers (for example, picture card #3 1843 and picture #4 1844) suitable for the image 1832 corresponding to at least one first area through a camera (for example, the first camera 121) as illustrated in FIG. 18B. The processor 250 may identify that a combination of the cup indicated by picture card #3 1843 and the ball indicated by picture card #4 1844 does not correspond to a cupcake indicated by the image 1832 on the basis of the acquired image. When the combination of the cup indicated by picture card #3 1843 and the ball indicated by picture card #4 1844 does not correspond to the cupcake indicated by the image 1832, the processor 250 may display a screen 1820 including an image 1821 and text 1822 (for example, "Uh oh!") configured to be displayed when the combination of the cup indicated by picture card #3 1843 and the ball indicated by picture card #4 1844 does not correspond to the cupcake indicated by the image 1832.

Figure 19:
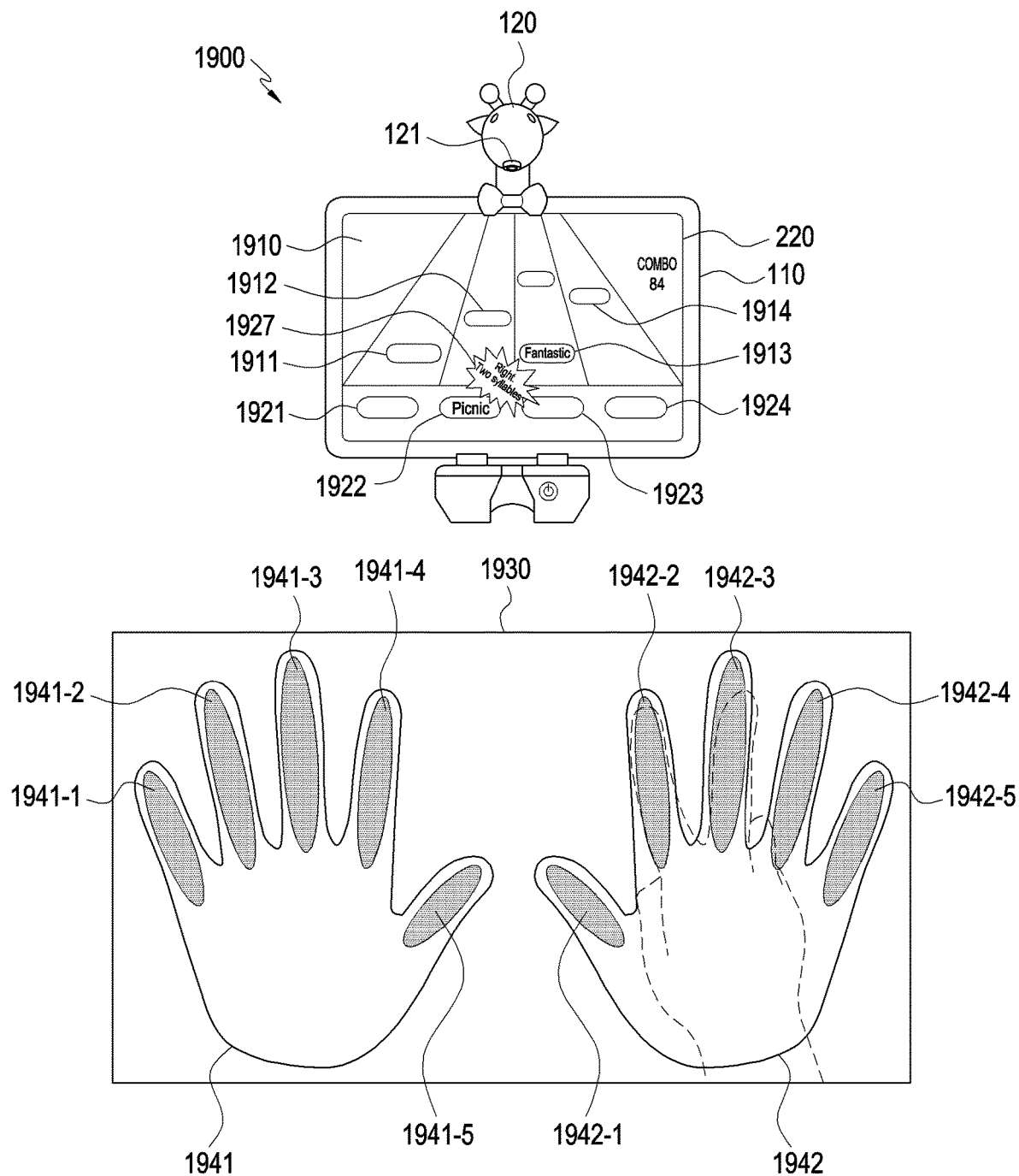
FIG. 19 illustrates a method of performing a function of the electronic device on the basis of a user interaction according to various embodiments.

FIG. 19 is a view 1900 illustrating a method of performing the function of the electronic device 110 on the basis of a user interaction according to various embodiments.

Referring to FIG. 19, in an embodiment, the processor 250 may perform a function related to a game application on the basis of a user interaction for a document while the electronic device 110 executes the game application.

In an embodiment, within a document 1930, a plurality of first areas (for example, area #1 1941-1, area #2 1941-2, area #3 1941-3, area #4 1941-4, and area #5 1941-5) may be displayed within an outline 1941 corresponding to a person's left hand and a plurality of first areas (for example, area #6 1942-1, area #7 1942-2, area #8 1942-3, area #9 1942-4, and area #10 1942-5) may be displayed within an outline 1942 corresponding a person's right hand.

In an embodiment, the game application may be a game application of increasing scores if user interactions for the plurality of first areas (for example, area #1 1941-1, area #2 1941-2, area #3 1941-3, area #4 1941-4, area #5 1941-5, area #6 1942-1, area #7 1942-2, area #8 1942-3, area #9 1942-4, and area #10 1942-5) corresponding to the number of syllables of an English word included in each of the objects 1911, 1912, 1913, and 1914 are detected when each of the objects 1911, 1912, 1913, and 1914 including English words and moving reaches the location of the fixed objects 1921, 1922, 1923, and 1924. For example, when the number of syllables of the English word included in the object is two and user interactions for two first areas which are the same as the number of syllables of the English word included in the object are detected, the processor 250 may increase the scores in the game and display a corresponding image 1927 through the display module 220.

Figure 20:
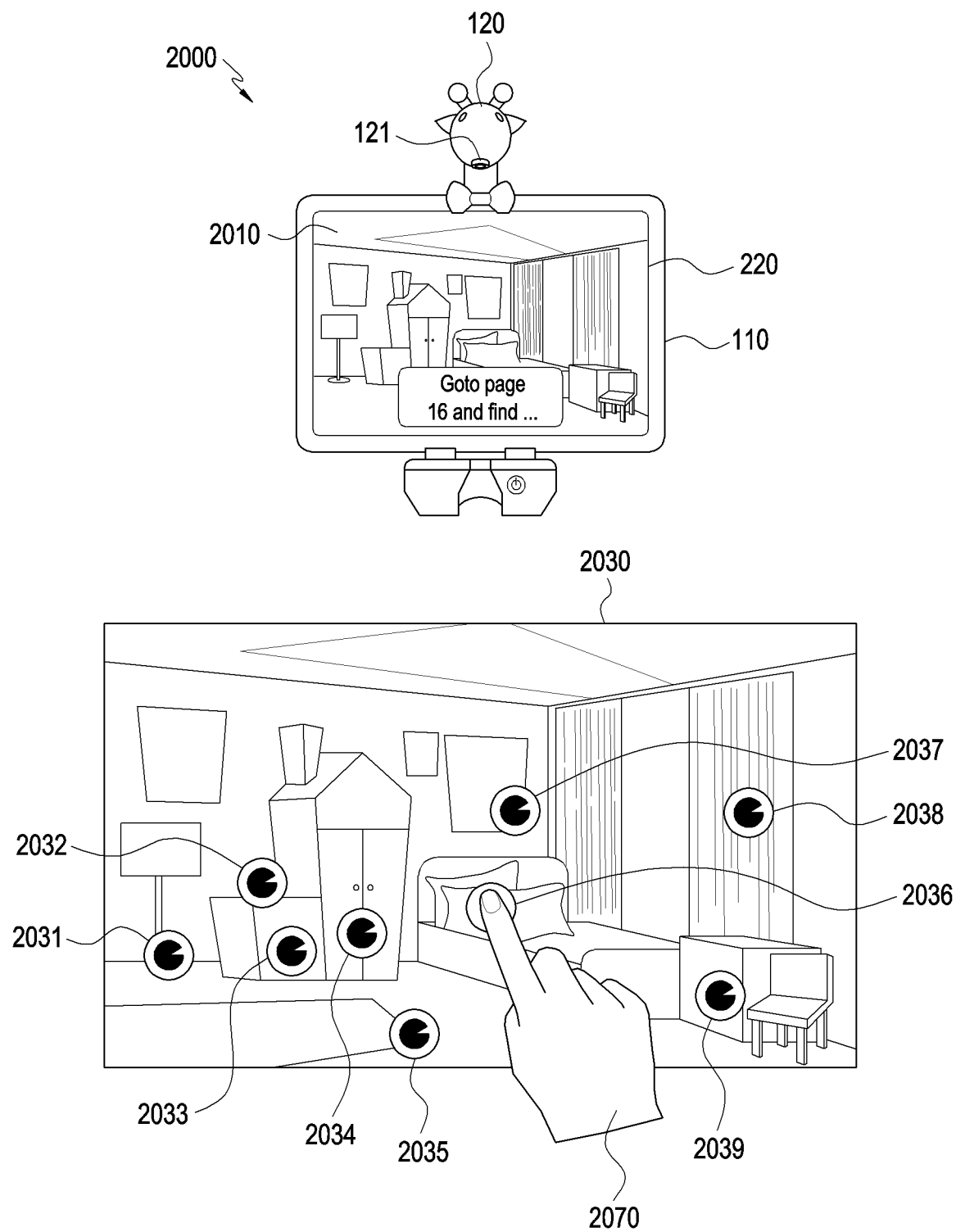
FIG. 20 illustrates a method of performing a function of the electronic device on the basis of a user interaction according to various embodiments.

FIG. 20 is a view 2000 illustrating a method of performing the function of the electronic device 110 on the basis of a user interaction according to various embodiments.

Referring to FIG. 20, in an embodiment, the processor 250 may perform a function related to a game application on the basis of a user interaction for a document while the electronic device 110 executes a game application (for example, a room escape game application).

In an embodiment, a document 2030 may include a plurality of first areas 2031, 2032, 2033, 2034, 2035, 2036, 2037, 2038, and 2039.

In an embodiment, the processor 250 may display a screen 2010 corresponding to the document 2030 through the display module 220 while the room escape game application is executed. When a user interaction for one first area (for example, the area 2036) is detected among the plurality of first areas 2031, 2032, 2033, 2034, 2035, 2036, 2037, 2038, and 2039 while the screen 2010 is displayed, the processor 250 may display a screen related to a room space configured to be displayed when the user interaction for one first area (for example, the area 2036) in which the user interaction is detected is detected through the display module 220.

Figure 21:
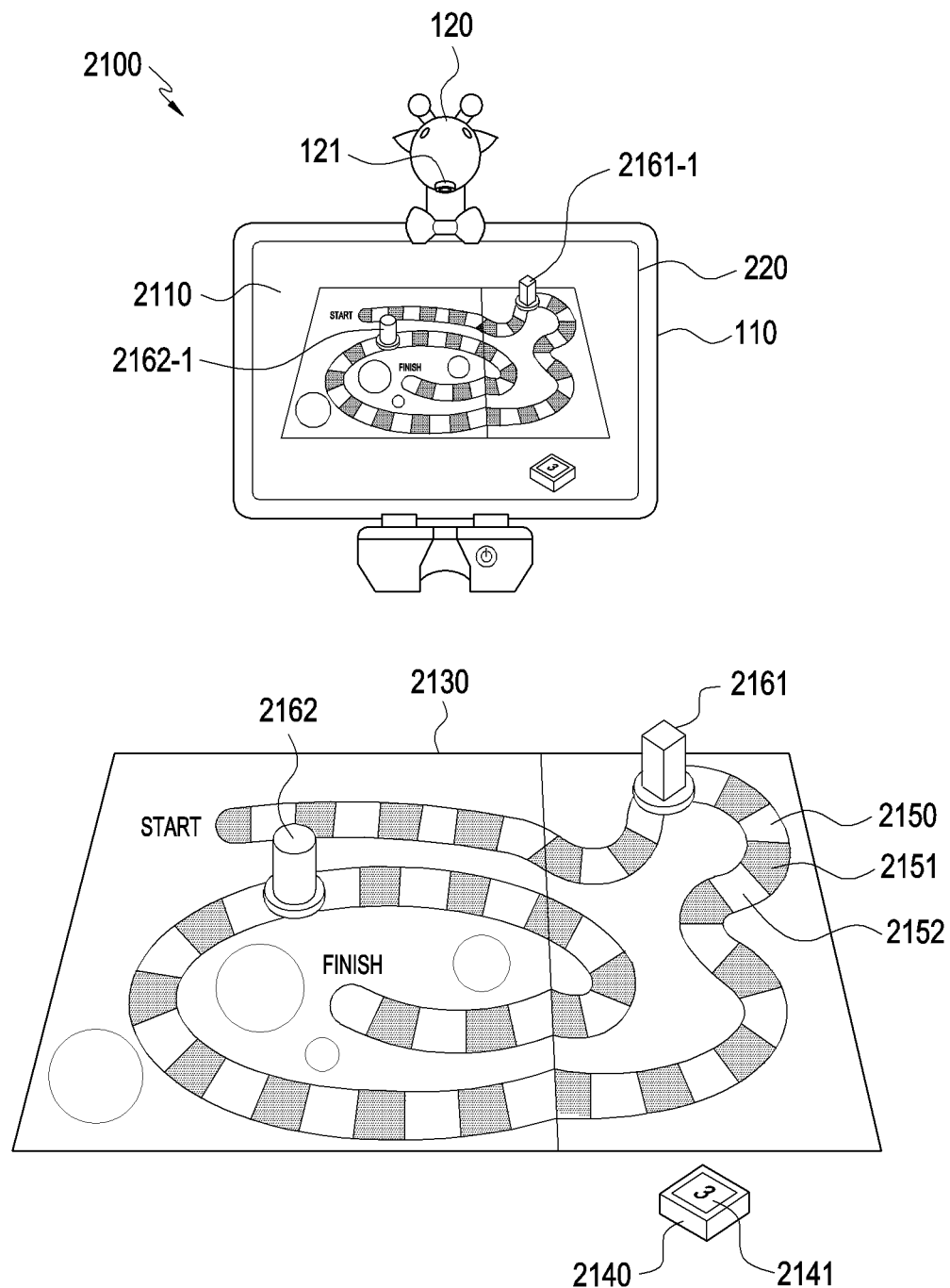
FIG. 21 illustrates a method of performing a function of the electronic device on the basis of a user interaction according to various embodiments.

FIG. 21 is a view 2100 illustrating a method of performing the function of the electronic device 110 on the basis of a user interaction according to various embodiments.

Referring to FIG. 21, in an embodiment, the user may play a board game by using a document 2130 (for example, a board of a board game) and the electronic device 110.

In an embodiment, the document 2130 may include a plurality of first areas (for example, areas 2150, 2151, and 2152) printed for playing the board game. In an embodiment, the processor 250 may display a screen 2110 corresponding to the document 2130 through the display module 220 on the basis of a first image for the document 2130 acquired through the camera. When the plurality of first areas are hidden by markers (for example, game markers 2161 and 2162), the processor 250 may move objects (for example, objects 2161-1 and 2162-1) corresponding to the markers (for example, the game markers 2161 and 2162) within the screen 2110 to the location of the screen 2110 corresponding to the plurality of hidden first areas.

In an embodiment, the processor 250 may identify a number (for example, number 3 2141) shown by a dice 2140 on the basis of an image acquired through the camera (for example, the first camera 121 and/or the second camera 111). The processor 250 may move the location of the objects (for example, the objects 2161-1 and 2162-1 corresponding to the markers (for example, the game markers 2161 and 2162)) on the basis of the location of the screen 2110 corresponding to the plurality of hidden first areas or the location of the plurality of hidden first areas, and the number (for example, number 6 2141) shown by the dice 2140.

A method of detecting a user interaction by an electronic device according to various embodiments may include an operation of acquiring a first image of a real document in which at least one first area is printed through a camera, an operation of determining that areas of at least one object corresponding to the at least one first area are changed within the first image as at least a part of the at least one first area of the real document is hidden by an input tool, and an operation of performing a function of the electronic device corresponding to the at least one object, based on the determination that the areas of the at least one object are changed.

In various embodiments, the operation of acquiring the first image may include an operation of successively acquiring a plurality of frames for the real document through a camera of a camera device communication-connected with the electronic device or the camera of the electronic device.

In various embodiments, the operation of determining whether at least one first part is changed may include an operation of determining whether the areas of the at least one first part are changed on the basis of the plurality of frames.

In various embodiments, the operation of determining whether the areas of the at least one first part are changed may include an operation of determining whether the areas of the at least one first part are decreased on the basis of the plurality of frames.

In various embodiments, the operation of determining whether the areas of the at least one first part are changed may include an operation of identifying a pattern in which the areas of the at least one first part are decreased, increased, and decreased on the basis of the plurality of frames.

In various embodiments, the operation of determining whether the areas of the at least one first part are changed may include an operation of determining whether the areas of the at least one first part are decreased and then maintained and whether shapes of the at least one first part and a location of a part having the reduced area within the at least one first part are changed.

In various embodiments, the operation of determining whether the areas of the at least one first part are changed may include an operation of determining whether shapes of the at least one first part are changed on the basis of the plurality of frames.

In various embodiments, the method may further include an operation of determining whether the at least one first area is hidden by a finger on the basis of the determination that the at least one first part is changed.

In various embodiments, the operation of acquiring the first image of the document including the at least one first area may include an operation of acquiring the first image of the document including the plurality of first areas, the operation of determining whether the at least one first part is changed may include an operation of determining whether two or more first parts corresponding to two or more first areas among the plurality of first areas and included in the first image are changed, and the operation of performing the function of the electronic device may include, when the two or more first parts are changed, an operation of selecting a first part on the basis of locations of the two or more first areas within the document or locations of the two or more first parts within the first image, and an operation of performing the function of the electronic device corresponding to the selected first part.

In various embodiments, the method may further include an operation of displaying a screen including a guide indicating that the at least one first area can be selected.

Further, a structure of data used in the embodiments of the disclosure can be recorded in a computer-readable recording medium through various means. The computer-readable recording medium includes a magnetic storage medium (for example, a ROM, a floppy disk, and a hard disk) and an optical reading medium (for example, a CD-ROM and a DVD).

A non-transitory computer-readable medium storing a program code which can be executed by a processor according to various embodiments is provided. The program code may be configured to, when the program code is executed, cause the processor to acquire a first image of a document including at least one first area through a camera, determine whether at least one first part corresponding to the at least one first area and included in the first image, and perform a function of the electronic device corresponding to the at least one first part on the basis of the determination that the at least one first part is changed.

In various embodiments, when the program code is executed, the program code may be configured to cause the processor to successively acquire a plurality of frames for the document through a camera of a camera device communication-connected with the electronic device or the camera of the electronic device.

In various embodiments, when the program code is executed, the program code may be configured to cause the processor to determine that the areas of the at least one object are changed, based on the plurality of frames.

In various embodiments, when the program code is executed, the program code may be configured to cause the processor to determine that the areas of the at least one object are decreased, based on the plurality of frames.

In various embodiments, when the program code is executed, the program code may be configured to cause the processor to identify a pattern in which the areas of the at least one object are decreased, increased, and decreased, based on the plurality of frames.

In various embodiments, when the program code is executed, the program code may be configured to cause the processor to determine that the areas of the at least one object are decreased and then maintained and shapes of the at least one object or a location of a part having the reduced area within the at least one object is changed.

In various embodiments, when the program code is executed, the program code may be configured to cause the processor to determine whether shapes of the at least one first part are changed, based on the plurality of frames.

In various embodiments, when the program code is executed, the program code may be configured to cause the processor to determine whether the at least one first area is hidden by a finger, based on the determination that the at least one first part is changed.

In various embodiments, when the program code is executed, the program code may be configured to cause the processor to acquire a first image of a document including a plurality of first areas, determine whether two or more first parts corresponding to two or more first areas among the plurality of first areas and included in the first image are changed, select a first part on the basis of location of the two or more first areas or locations of the two or more first parts included in the first image when the two or more first parts are changed, and perform a function of the electronic device corresponding to the selected first part.

In various embodiments, when the program code is executed, the program code may be configured to cause the processor to further display a screen including a guide indicating that the at least one first area can be selected.

What is claimed is:
1. A method of detecting a user interaction by an electronic device, the method comprising:
 acquiring, by a processor of the electronic device, through a camera, a first image of a real document in which at least one first area is printed, the first image including a plurality of frames sequentially acquired though the camera;

based on at least a part of the at least one first area of the real document being hidden by an input tool, determining, by the processor, that an area of at least one object corresponding to the at least one first area is changed within the plurality of frames, the at least one object respectively representing the at least one first area in the plurality of frame; and based on determining that the area of the at least one object is changed, performing, by the processor, a function of the electronic device corresponding to the at least one object, wherein based on at least the part of the at least one first area of the real document being hidden, the area of the at least one object which has existed in a first frame disappears in a second frame next to the first frame or a size of the area of the at least one object is reduced in a portion of the plurality of frames, the first frame and the second frame being included in the plurality of frames, wherein based on determining that an area of a first object included in the at least one object is changed, a first function of the electronic device corresponding to the first object is performed, and wherein based on determining that an area of a second object included in the at least one object is changed, a second function of the electronic device corresponding to the second object is performed, the second object being different from the first object, the second function being different from the first function.

2. The method of claim 1, wherein the acquiring of the first image comprises receiving, through communication circuitry of the electronic device from a camera device including the camera, the plurality of frames for the real document sequentially acquired through the camera of the camera device, where the camera device is implemented to hold the electronic device.

3. The method of claim 1, wherein the determining that the area of the at least one object is changed comprises identifying, based on the plurality of frames, a pattern in which the area of the at least one object is decreased, increased, and decreased.

4. The method of claim 1, wherein the determining that the area of the at least one object is changed comprises determining that the area of the at least one object is decreased and then maintained, and a shape of the at least one object or a location of a part having the decreased area within the at least one object is changed.

5. The method of claim 1,
wherein the input tool comprises a user's finger, an electronic pen, or a marker, and
wherein at least the part of the at least one first area of the real document is hidden as at least the part of the at least one first area of the real document is covered by the input tool.

6. The method of claim 1,
wherein the acquiring of the first image of the real document in which the at least one first area is printed comprises acquiring the first image of the real document in which a plurality of first areas are printed,
wherein the determining that the area of the at least one object is changed comprises determining that areas of two or more objects corresponding to two or more first areas among the plurality of first areas are changed within the plurality of frames based on the two or more first areas of the real document being hidden by the input tool, and wherein the performing of the function of the electronic device comprises:
based on the areas of the two or more objects being changed, selecting one object from among the two or more objects, based on locations of the two or more first areas within the real document or the locations of the two or more objects within the first image; and
performing the function of the electronic device corresponding to the selected one object.

7. The method of claim 1, further comprising displaying a screen including a guide indicating that the at least one first area is capable of being selected.

8. A non-transitory computer-readable medium storing a program code, wherein the program code, when executed by a processor of an electronic device, cause the electronic device to perform operations, the operations comprising:
acquiring, through a camera, a first image of a real document in which at least one first area is printed, the first image including a plurality of frames sequentially acquired though the camera;

based on at least a part of the at least one first area of the real document being hidden by an input tool, determining that an area of at least one object corresponding to the at least one first area is changed within the plurality of frames, the at least one object respectively representing the at least one first area in the plurality of frame; and based on determining that the area of the at least one object is changed, performing a function of the electronic device corresponding to the at least one object, wherein based on at least the part of the at least one first area of the real document being hidden, the area of the at least one object which has existed in a first frame disappears in a second frame next to the first frame or a size of the area of the at least one object is reduced in a portion of the plurality of frames, the first frame and the second frame being included in the plurality of frames, wherein based on determining that an area of a first object included in the at least one object is changed, a first function of the electronic device corresponding to the first object is performed, and wherein based on determining that an area of a second object included in the at least one object is changed, a second function of the electronic device corresponding to the second object is performed, the second object being different from the first object, the second function being different from the first function.

9. The non-transitory computer-readable medium of claim 8, wherein the operations further comprising:
receiving, through communication circuitry of the electronic device from a camera device including the camera, the plurality of frames for the real document sequentially acquired through the camera of the camera device, where the camera device is implemented to hold the electronic device.

10. The non-transitory computer-readable medium of claim 8, wherein the operations further comprising:
identifying, based on the plurality of frames, a pattern in which the areas of the at least one object are decreased, increased, and decreased.

11. The non-transitory computer-readable medium of claim 8, wherein the operations further comprising:

determining that the area of the at least one object is decreased and then maintained and a shape of the at least one object or a location of a part having the reduced area within the at least one object is changed.

12. The non-transitory computer-readable medium of claim 8,
wherein the input tool comprises a user's finger, an electronic pen, or a marker, and
wherein at least the part of the at least one first area of the real document is hidden as at least the part of the at least one first area of the real document is covered by the input tool.

13. The non-transitory computer-readable medium of claim 8, wherein the operations further comprising:
acquiring the first image of the real document in which a plurality of first areas are printed;
determining that areas of two or more objects corresponding to two or more first areas among the plurality of first areas are changed within the plurality of frames, based on the two or more first areas of the real document being hidden by the input tool;
based on the two or more objects being changed, selecting one object from among the two or more objects, based on locations of the two or more first areas within the real document or locations of the two or more objects within the first image; and
performing a function of the electronic device corresponding to the selected one object.

14. The non-transitory computer-readable medium of claim 8, wherein the operations further comprising:
displaying a screen including a guide indicating that the at least one first area is capable of being selected.

* * * * *